US008090676B2

(12) United States Patent
Patel et al.

(10) Patent No.: US 8,090,676 B2
(45) Date of Patent: Jan. 3, 2012

(54) SYSTEMS AND METHODS FOR REAL TIME CLASSIFICATION AND PERFORMANCE MONITORING OF BATCH PROCESSES

(75) Inventors: Shailesh Rajnikant Patel, Gujarat (IN);
Ramprasad Yelchuru, Bangalore (IN);
Srikanth Ryali, Bangalore (IN);
Pradeep K. Shetty, Bangalore (IN);
Gudi Ravindra, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 783 days.

(21) Appl. No.: 12/208,686

(22) Filed: Sep. 11, 2008

(65) Prior Publication Data

US 2010/0063611 A1 Mar. 11, 2010

(51) Int. Cl.
G06F 15/00 (2006.01)
G06F 15/18 (2006.01)
G06F 19/00 (2006.01)

(52) U.S. Cl. .......................... 706/62; 700/108
(58) Field of Classification Search .................... 706/62; 700/108
See application file for complete search history.

(56) References Cited

U.S. PATENT DOCUMENTS

| 6,564,119 | B1 | 5/2003 | Vaculik et al. |
| 2002/0169735 | A1 | 11/2002 | Kil et al. |
| 2005/0125449 | A1 | 6/2005 | Wong et al. |
| 2008/0013821 | A1 | 1/2008 | MacGregor et al. |

OTHER PUBLICATIONS

J.F. MacGregor and T. Kourti, "Statistical Process Control of Multivariate Processes", Control. Eng. Practice, vol. 3, No. 3, pp. 403-414, 1995.*
M. Kano et al., "Comparison of multivariate statistical process monitoring methods with applications to the Eastman challenge proglem", Computers and Chemical Engineering 26 (2001), pp. 161-174.*
Jonathon Shlens; Tutorial on Principal Component Analysis, Dec. 10, 2005 Version 2; pp. 1-13.

* cited by examiner

Primary Examiner — Jeffrey A Gaffin
Assistant Examiner — Vincent Gonzales
(74) Attorney, Agent, or Firm — Jetter & Associates, P.A.

(57) ABSTRACT

Systems and methods (300) for offline/online performance monitoring of batch processes (BPs) involving obtaining archived data (AD) obtained during runs of BP and including information defining a batch quality attribute for each run. The method also involves forming clusters by classifying AD for the runs into classes based on the batch quality attribute(s) and building a first multivariate statistical model (MSM) using AD. The method can further involve building a wavelet analysis based feature matrix (FM) using AD, forming a first projection (1200) by projecting FM onto a first MSM, building a second MSM (1300) using information obtained from the first projection, and computing centroids ($C_{902}, \ldots, C_{918}$) and boundary profiles for the clusters (902, . . . , 918). The method can involve performing an online/offline performance monitoring (700/800) using an integrated version of the first and second MSM, a classification algorithm, centroids, and boundary profiles.

21 Claims, 15 Drawing Sheets

SYSTEMS AND METHODS FOR REAL TIME CLASSIFICATION AND PERFORMANCE MONITORING OF BATCH PROCESSES

FIELD OF THE INVENTION

The invention concerns systems and methods for real time classification and online/offline performance monitoring of batch processes.

BACKGROUND

Batch processes are used in industrial processes for a variety of industries (e.g., the food and chemical industries). A "batch process", as used herein, refers to a process that runs for a finite duration to produce a batch of product at the end of the duration. The antithesis of a batch process is a continuous process, where raw materials are continuously fed into operation and products are continuously withdrawn from the process. An example of a continuous process is a distillation column. Batch processes are often used in industrial processes for manufacturing batches of specialty products with high added value. Such specialty products include, but are not limited to, pharmaceuticals, resins, and composites. Batch processes are also typically used in industrial processes for producing batches of food. Online monitoring of such batch processes is important for safe and cost effective production of high quality products.

The inherent time varying nature of batch processes results in a variation of batch conditions throughout the duration of the batch process. The phrase "batch condition", as used herein, refers to the state (or health) of the product being manufactured during a batch process. The state (or health) of a batch operation for making a product can generally be defined in terms of normalcy. For example, a batch condition can indicate a healthy batch of product (i.e., a normal batch of product) or an unhealthy batch of product (i.e., an abnormal batch of product).

There are several methods known in the art for online monitoring of batch processes. These conventional methods are generally oriented towards classifying a batch run as normal or abnormal with a view to provide alarms if the operation is abnormal. These conventional methods also help towards mitigation steps so as to correct an abnormal batch run and bring it back to normal operation (whenever such steps are feasible in practice).

Conventional process monitoring methods generally involve assessing a batch condition at a particular time during the evolution of a batch process. This assessment generally involves: (a) collecting data of the measured variables obtained during the performance of the batch process (i.e., from a start time $t_0$ to the particular time t); (b) considering each measured variable as a distinct variable; (c) considering a set of measured variables as a collection of variables; and (d) representing the collection of variables as a single vector V. The vector V computation requires the complete batch history, which presents a challenge for online assessment of the state of the batch since the set of measured variables are not fully obtained until the batch process is complete. As a result, the assessment requires the forecasting of future variable measurements. The forecasting of future variable measurements generally requires filling up unobserved data related to the unperformed portion of the batch process with historical data, i.e., data obtained during a previous performance of a batch process. This forecasting process ensures that the batch conditions of the product being manufactured are compared to archived batch conditions of manufactured products. In effect, the health of the product being manufactured is assessed in a statistical manner.

However, there are no methods known in the art that are oriented towards performance monitoring of batch runs. Performance monitoring can be logically conceived as the next step after process monitoring to further classify normal batch runs in terms of a set of performance criteria. Performance monitoring in real time during the batch run facilitates an early characterization of the batch run in terms of its performance (qualified in terms of best, good, and average performance) and enables the initiation of remedial measures to improve the batch process performance (whenever necessary and possible). Such steps would help in generating a set of batch runs that have relatively minimal variation amongst them. Such steps also facilitate a shift in the performance of batch runs closer towards the specification on quality. In effect, the steps can result in substantial improvement in manufacturing efficiencies of batch runs.

The conventional process monitoring methods for online monitoring of batch processes described above suffer from certain drawbacks, which prevent these process monitoring methods from being used for performance monitoring. Online process monitoring usually compares the time trajectory of variables in an on-going batch with the trajectories from the archived measurement set which have been classified as normal. Whenever an abnormality occurs in a batch process, the time trajectories of the variables can change substantially. Also, the time trajectories are dissimilar when compared with the trajectories in the archived set. Therefore, abnormalities can be easily resolved in a reasonable time and abnormality conditions can be flagged in a reasonable time. On the other hand, online performance monitoring requires a comparison of variable trajectories that could be similar (but not the same) to the trajectories towards a clearer batch classification on the basis of performance. Improved methods and algorithms that provide a sharper resolution between the time trajectories need to be developed and deployed.

SUMMARY

This summary is provided to comply with 37 C.F.R. §1.73, presenting a summary of the invention briefly indicating the nature and substance of the invention. It is submitted with the understanding that it will not be used to interpret or limit the scope or meaning of the claims.

Embodiments of the present invention addresses some of the key challenges posed by batch processes and provides novel solutions to the consequent requirements that stem from a drive towards enhancement of manufacturing efficiencies in batch processes. As a primary requirement, real time quality assurance of batch quality indices (i.e. assurance of a batch quality even as it evolves in real time during the batch run) has been identified to be of high importance by regulatory bodies such as the Food and Drug Administration (FDA), specifically for batch manufacturing associated with life sciences industry. Another key requirement for improving manufacturing efficiencies is to minimize variation in the important batch quality indices from run to run. Towards this requirement as well, accurate prediction of end quality indices is deemed important. Finally, towards initiation of early corrective action to remedy potentially low-quality batches during the run and improve their quality, it is necessary that early classification of such batches is achieved. Embodiments of the present invention address these key requirements by achieving paradigm shifts to existing approaches and by deploying novel enablers so as to facilitate improved manufacturing practices.

The task of building prediction models that facilitate performance monitoring involves the use of statistical model building procedures that rely on archived data of past fully performed batch runs. As is well known to those having ordinary skill in the art, the mining of information from this archive involves many challenges exemplified, but not limited by (i) efficient unfolding of the three way data matrices into two way data matrices, (ii) addressing unequal batch durations and therefore sizes of the data records in the unfolded matrix, (iii) accommodating differing time scales and statistical non-stationarity in the time series of the data in the archived batch records, and (iv) the presence of nonlinearity in the cause and effect relationships that makes the prediction task fairly complex. Embodiments of the present invention address the above challenges in a systematic manner through the use of (a) multi-scale signal processing tools (such as wavelet based functional approximation) which enable efficient unfolding and representation of the three way data matrices and also accommodate multi-scale behavior of the batch variables, (b) fuzzy classification methods to address the problem of establishing batch similarities and facilitate completion of batch records in the presence of unequal batch durations and non-stationary behavior, and (c) discriminatory learning methods that facilitate clear resolution of the batch trajectories and aid in accurate batch classification and real-time quality prediction.

Embodiments of the present invention thus concern batch processing systems and methods for online/offline performance monitoring of a batch process. The methods involve obtaining archived batch process data (archived data) for the batch process. The archived data includes stored process data obtained during runs of the batch process. The archived data also includes information defining at least one batch quality attribute for the runs of the batch process. The methods also involve forming clusters by classifying the archived data for a pre-selected subset of batch runs into classes based on the batch attribute(s). Each cluster includes archived data related to at least two runs having the same classification (i.e., having similar characteristics). Each cluster is characterized by (i) a centroid that is most representative of the batch behavior in that class and (ii) a set of boundary profiles that envelope the runs that belong to the class or cluster. The methods further involve building a feature matrix using the archived data, building a first multivariate statistical model (MSM) using the feature matrix, forming a first projection by projecting feature vectors onto the first MSM, and building a second MSM using information obtained from the first projection. The feature matrix includes feature vectors representing Wavelet coefficients determined for the time trajectories of the variables $v_0, \ldots, v_J$. The offline/online performance monitoring of the batch process is performed using an integrated version of both MSMs along with their classification algorithms (such as the fuzzy contributions) and the centroids.

BRIEF DESCRIPTION OF THE DRAWINGS

Embodiments will be described with reference to the following drawing figures, in which like numerals represent like items throughout the figures, and in which.

DETAILED DESCRIPTION OF THE DRAWINGS

Figure 1:
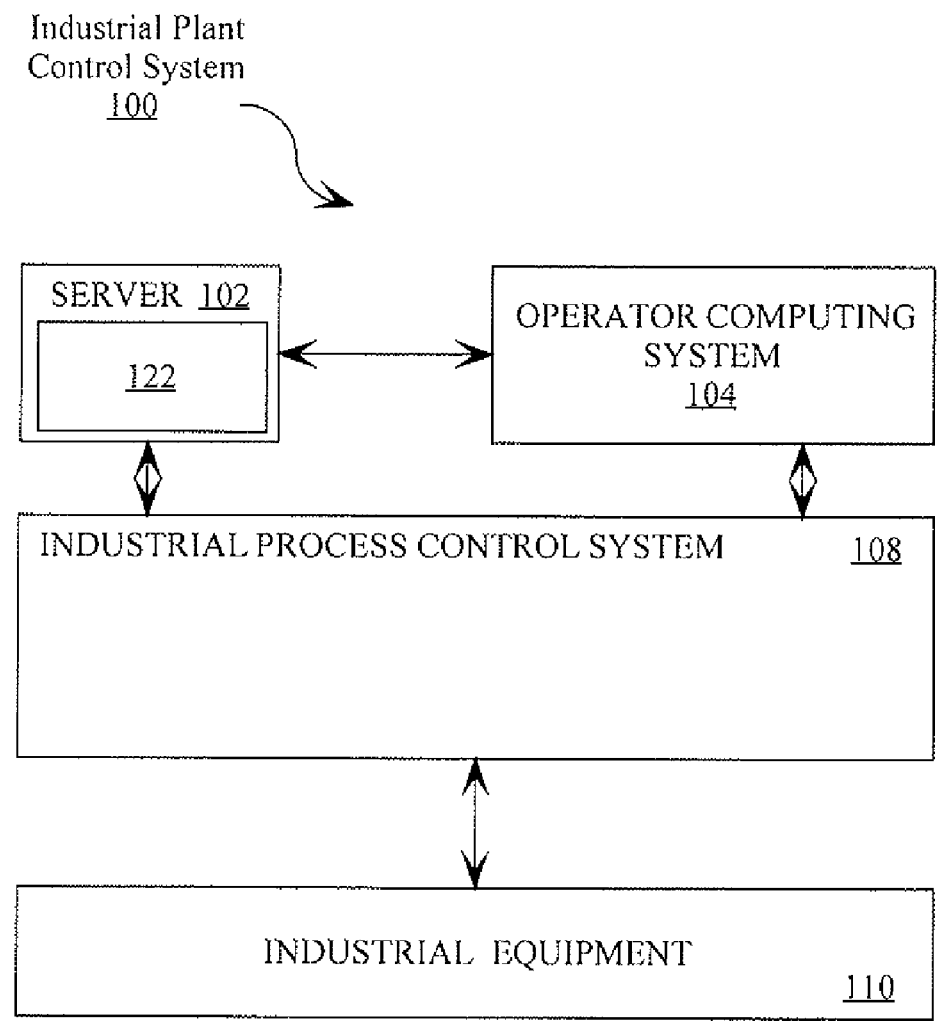
FIG. 1 is a block diagram of a conventional industrial plant control system according to an embodiment of the invention.

Embodiments of the invention provide systems and methods for offline and/or online performance monitoring of batch processes. Notably, the methods involve using multivariate statistical tools to characterize operations of a batch process in terms of batch attributes or quality indicators (e.g., a yield of a run of a batch process and a total duration of a run of a batch process). It should be noted that the batch attributes or quality indicators represent the overall batch performance. The batch attributes or quality indicators are typically measured at the end of the batch run.

The methods also involve performing an online or offline performance monitoring to predict the health of a batch in terms of the batch attributes. In online performance monitoring, a prediction of the batch attributes or quality indicators is performed in real time. In effect, real time quality assurance is provided without taking frequent samples for assay purposes during the batch run. Real time quality assurance is recently identified by regulatory bodies (such as the Food and Drug Administration) to be an important requirement in batch processes. The batch attribute or quality indicator predictions enable the initiation of performance enhancement steps so as to correct (in real time) the batch runs that have a potential to evolve as relatively lower quality batches. In addition, the online real time prediction also helps to optimally schedule the downstream operations.

Embodiments of the present invention overcome certain drawbacks of conventional methods for online monitoring of batch processes (such as the conventional method described above in relation to the Background). For example, embodiments of the present invention can provide a better prediction of batch evolution as compared to the predictions provided by conventional methods for online monitoring of batch processes. Embodiments of the present invention can also generally provide earlier detection of abnormal batch conditions as compared to the detection provided by conventional methods for online batch process monitoring. Earlier detection of abnormal conditions can facilitate a correction of batch process operations before the abnormal batch condition becomes incurable. The earlier detection of abnormal conditions can also facilitate an earlier termination of a batch process if remedial measures are not possible (such as when a chemical has been contaminated). In summary, the method described herein works as a decision support system for the batch processes either to trigger the performance enhancement steps or to terminate the batch for scheduling the downstream operations.

The invention will now be described more fully hereinafter with reference to accompanying drawings, in which illustrative embodiments of the present invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Before describing method embodiments of the present invention, it will be helpful in understanding an exemplary environment in which the methods can be utilized. In this regard, it should be understood that the method embodiments of the present invention can be utilized in any application where a batch run can be improved by performance monitoring. Such applications include, but are not limited to, industrial plant applications, food production applications, chemical production applications, specialty product manufacturing applications, and semi-conductor manufacturing applications. Accordingly, method embodiments of the present invention will now be described in relation to one particular application, namely, the industrial plant application.

Referring now to FIG. 1, there is provided a block diagram of an exemplary industrial plant control system 100 according to an embodiment of the present invention. As shown in FIG. 1, the control system 100 comprises a server 102, an operator computing system (OCS) 104, an industrial process control system (IPCS) 108, and industrial equipment 110. It should be noted that the components 102, 108, and 110 are generally the same as or substantially similar to those contained in a conventional industrial plant control system. However, the OCS 104 can include hardware and/or software configured to implement at least a portion of embodiments of the present invention. This OCS implementation of the present invention will become more evident as this discussion progresses.

Servers are well known to those having ordinary skill in the art, and therefore will not be described herein. However, it should be understood that the server 102 is configured to perform application specific actions for controlling the industrial equipment 110 and/or monitoring a performance of a batch process run by equipment 110. As noted above, a batch process is a process that runs for a finite duration of time to produce the batch of a product at the end of the duration. The batch of product can include, but is not limited to, a pharmaceutical, a resin, a composite chemical, and a food product.

Referring again to FIG. 1, server 102, IPCS 108, and OCS 104 collectively control the industrial equipment 110 and/or facilitate the monitoring of the performance of a batch process. In one non-limiting application, IPCS 108 can be a distributed control system, i.e., there are application specific modules connected to each other, industrial equipment, and operator interfaces via a local control network. Industrial equipment 110 may include, but is not limited to, gauges, valves, transmitters, actuators, and sensors. Embodiments of the present invention are not limited in this regard.

As shown in FIG. 1, server 102 is configured to communicate with OCS 104 for displaying monitor and/or control information to a user (e.g., an operator, an engineer, a technician, or a supervisor). In this regard, it should be understood that server 102 can be configured to receive information from OCS 104 and/or IPCS 108. Such information generally includes, but is not limited to, batch process data representing samples $s_0, \ldots, s_S$ of variables $v_0, \ldots, v_j$. The variables $v_0, \ldots, v_j$ are batch process parameters (BPPs) measured during a run of a batch process. The samples $s_0, \ldots, s_S$ are values of the variables $v_0, \ldots, v_j$ obtained during a plurality of runs of a batch process. The batch process data (BPD) representing the samples $s_0, \ldots, s_S$ of variables $v_0, \ldots, v_j$ can include timestamps. Timestamps facilitate the identification of the points of a batch process when the samples $s_0, \ldots, s_S$ of variables $v_0, \ldots, v_j$ were obtained. Such samples $s_0, \ldots, s_S$ values can include, but are not limited to, temperature values, pressure values, pH values, concentration values, and fluid flow rate values. Server 102 is generally comprised of a memory device 122 for storing the received information.

OCS 104 may be a desktop personal computer system, a laptop personal computer system, a personal digital assistant, a mobile computing device, or any other general purpose computer processing device. Accordingly, OCS 104 is configured to display content in display screen windows. The phrase "display screen window", as used herein, refers to a visual area of a display screen containing content. Such content can include, but is not limited to, still images, video images, an animated image, text, graphs, charts, data, graphical user interfaces (GUIs), projections, or any other information useful in monitoring the performance of a desired batch process.

Figure 2:
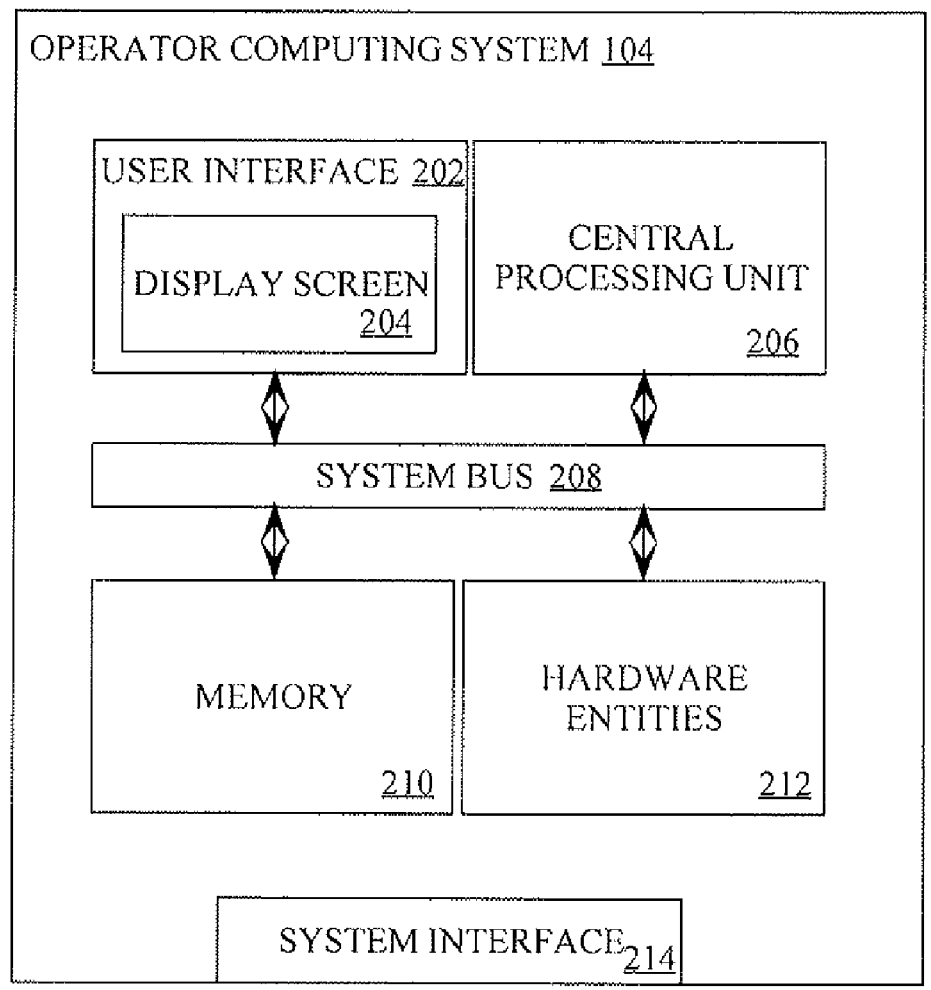
FIG. 2 is a detailed block diagram of the operator computing system of FIG. 1.

Referring now to FIG. 2, there is provided a more detailed block diagram of OCS 104 of FIG. 1. As shown in FIG. 2, OCS 104 is comprised of a system interface 214, a user interface 202, a central processing unit 206, a system bus 208, a memory 210 connected to and accessible by other portions of OCS 104 through system bus 208, and hardware entities 212 connected to system bus 208. At least some of hardware entities 212 perform actions involving access to and use of memory 210, which for example may be a random access memory (RAM), a disk driver, and/or a compact disc read only memory (CD-ROM).

Hardware entities 212 may include microprocessors, application specific integrated circuits (ASICs), or other hardware. Hardware entities 212 may include a microprocessor programmed for communicating with server 102 (described above in relation to FIG. 1). More particularly, hardware entities 212 may include a microprocessor programmed for retrieving archived or current batch process data from server 102 (described above in relation to FIG. 1). The archived and current batch process data can include data obtained during actual runs of a batch process and/or data obtained during simulated runs of a batch process. The archived batch process data can also include, but is not limited to, sets of samples $s_0, \ldots, s_S$ for a plurality of variables $v_0, \ldots, v_j$ obtained during a plurality of fully performed runs of a batch process. The current batch process data can include, but is not limited to, sets of samples $s_0, \ldots, s_S$ for a plurality of variables $v_0, \ldots, v_j$ obtained during a current run of a batch process. The microprocessor can also be programmed for communicating information defining multivariate statistical models which characterize operations of a batch process. The multivariate statistical models are generally built based on multivariate statistical analysis methods. Such multivariate statistical analysis methods include, but are not limited to, Principal Component Analysis (PCA) based methods, Partial Least Squares (PLS) based methods, and Fisher Discriminant Analysis (FDA) based methods. Each of these listed methods is well known to those having ordinary skill in the art, and therefore will not be described herein.

User interface 202 is generally comprised of input devices, output devices, and software routines configured to allow a user to interact with and control software applications installed on OCS 104. Such input and output devices include, but are not limited to, a display screen 204, a speaker (not shown), a keypad (not shown), a directional pad (not shown), a directional knob (not shown), and a microphone (not shown). As such, user interface 202 can facilitate a user-software interaction for communicating with server 102 (described above in relation to FIG. 1). User interface 202 can also facilitate user-software interactions for performing the method described below in relation to FIG. 3. In this regard, it should be understood that user interface 202 can facilitate user-software interactions for retrieving archived batch process data (hereinafter referred to as "archived data" or "ABPD") from server 102 (described above in relation to FIG. 1). The archived data can include, but is not limited to, (a) information defining total lengths of a plurality of fully performed runs (FPRs) of a batch process, (b) information defining batch attributes (e.g., yields of runs of a batch process), and (c) sets of samples $s_0, \ldots, s_S$ for each variable $v_0, \ldots, v_J$. User interface 202 can also facilitate user-software interactions for classifying fully performed runs FPRs into a plurality of classes based on batch attributes, such as the lengths of the fully performed runs FPRs and the yields of the fully performed runs FPRs.

User interface 202 can further facilitate user-software interactions for compressing the data representing the sets of samples $s_0, \ldots, s_S$ of variables $v_0, \ldots, v_J$ and processing the compressed data to generate sets of wavelet coefficients. The sets of wavelet coefficients will be described below in relation to FIGS. 3A-3B. User interface 202 can facilitate user-software interactions for building feature matrixes FMs using the sets of wavelet coefficients. A feature matrix FM can be built for each fully performed run of the batch process. User interface 202 can further facilitate user-software interactions for building multivariate statistical models using the feature vectors contained in the feature vector matrices and performing offline/online monitoring of the performance of a batch process.

System interface 214 allows OCS 104 to communicate directly or indirectly with server 102. If OCS 104 is communicating indirectly with server 102, then OCS 104 is sending and receiving communications through a network (not shown). For example, the network (not shown) can be a wireless network such as a local area network, a wide area network, or a personal area network.

FIGS. 3A-8B and accompanying text described below illustrate an exemplary method 300 according to an embodiment of the invention. Method 300 is provided for (a) building multivariate statistical models using supervised and/or unsupervised multivariate statistical methods and (b) performing offline or online monitoring of the performance of a batch process. It should be appreciated, however, that method 300 disclosed herein is provided for purposes of illustration only and that embodiments of the present invention are not limited solely to the particular method shown.

Figure 3A:
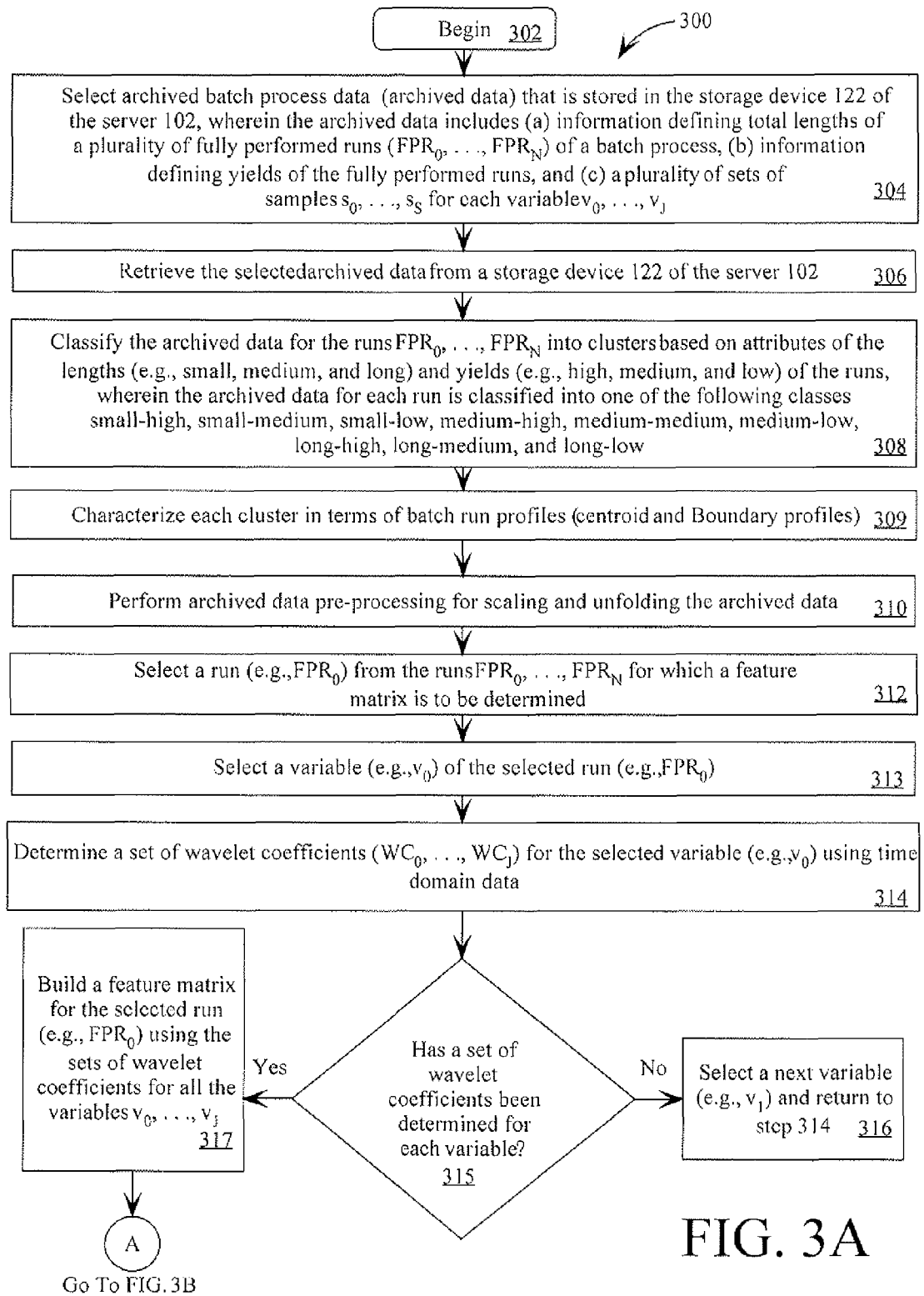
FIGS. 3A-3B collectively provide a flow diagram of a method for offline or online performance monitoring of a batch process according to an embodiment of the invention.

Referring now to FIG. 3A, method 300 begins with step 302 and continues to step 304. In step 304, archived data is selected. The archived data is stored historical data that was obtained during a plurality of actual or simulated runs of a batch process. The archived data can be stored in memory device 122 of server 102 (described above in relation to FIG. 1) in accordance with any suitable data storage format. As noted above, the archived data can include information defining the lengths of fully performed runs (FPRs) of a batch process. The archived data can also include information defining batch attributes (e.g., yields of the FPRs and/or stages of a batch of product). The archived data can further include a plurality of samples $s_0, \ldots, s_S$ of variables $v_0, \ldots, v_J$. Subsequent to selecting the archived data, it is retrieved from a storage device in step 306.

Thereafter, method 300 continues with step 308. In step 308, the archived data for each FPR is classified into clusters. It should be noted that step 308 is performed so that the archived data for each FPR can be used by a supervised data discriminating algorithm in a subsequent step 326 of FIG. 3B. According to an embodiment of the invention, the supervised data discriminating algorithm is an FDA based algorithm. Embodiments of the present invention are not limited in this regard.

Figure 9:
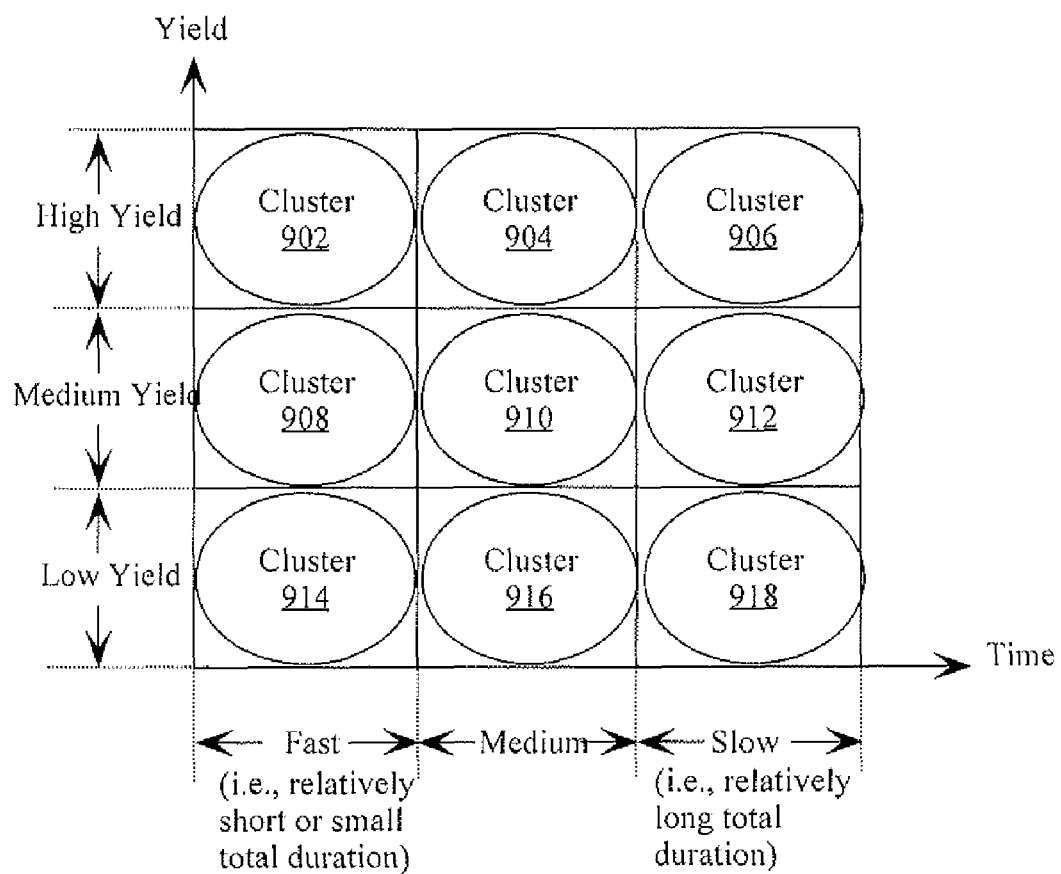
FIG. 9 is a graph illustrating a classification of fully performed runs (FPRs) of a batch process based on the yields of the FPRs and the total duration of the FPRs.

The archived data can be classified based on batch attributes (also referred to herein as "batch quality attributes"). The batch attributes generally include the lengths of the FPRs and the yields of the FPRs. If the batch attributes include the lengths (or total durations) of the FPRs and the yields of the FPRs, then the classes can generally include a small duration-high yield class, a small duration-medium yield class, a small duration-low yield class, a medium duration-high yield class, a medium duration-medium yield class, a medium duration-low yield class, long duration-high yield class, a long duration-medium yield class, and a long duration-low yield class. The small duration-high yield class represents the most desirable performance of a batch process. In contrast, the long duration-low yield class represents the least desirable performance of a batch process. A graph illustrating an exemplary classification of FPRs based on batch attributes (i.e., lengths and yields) is provided in FIG. 9.

Upon classifying the archived data for the FPRs, method 300 continues with step 309. In step 309, each cluster 902, ..., 918 containing a plurality of batch runs is characterized in terms of its centroid and boundary profiles. Generally, the numbers of boundary profiles are $M \cdot N_{CLASS}$ FPRs (i.e., runs of the batch process which have been fully performed) are selected as cluster prototypes. These cluster prototypes are understood as those FPRs that are maximally representative of the FPRs in that cluster. M is an integer (e.g., 5) representing the number of cluster characteristic profiles. $N_{CLASS}$ is an integer (e.g., 9) representing the number of classes. Thereafter, step 310 is performed. In step 310, the archived data is pre-processed. It should be noted that step 310 is performed for placing the archived data in a format required by multivariate statistical analysis methods. In this regard, it should be understood that multivariate statistical analysis methods use two way arrays of data. In contrast, the archived data is expressed as a three way array of data. The three way array is defined by a variable $v_0, \ldots, v_J$, a time, and a run of the batch process. If the archived data is to be used in a statistical analysis method, then the three way array of the archived data is scaled and unfolded into a two way array of scaled archived data.

The archived data can be scaled using any scaling method known to those having ordinary skill in the art. It should be noted that embodiments of the present invention use multivariate statistical analysis methods to monitor the status of a batch of product. The multivariate statistical analysis methods rely solely on data obtained during the performance of a batch process, i.e., the multivariate statistical analysis methods do not require knowledge of the batch process. The data used in the multivariate statistical analysis methods can include, but is not limited to, data representing process variables or parameters information (such as temperature values, pressure values, pH values, and concentration values). The measurement units of the each type of value are different. For example, the temperature values vary from three hundred degrees Kelvin (300 K) to four hundred degrees Kelvin (400 K). The pressure values vary from one pound per square inch (1 psi) to five pounds per square inch (5 psi). The pH values vary from five (5) to five and half (5.5). If the temperature, pressure and pH values are used by the multivariate statistical analysis methods, then the multivariate statistical analysis methods are most sensitive to temperature and least sensitive to pH. This sensitivity characteristic of the multivariate statistical analysis methods is due to the fact that the change in temperature values is greater than the change in pH values. In order to equalize the contribution of each type of value, the data is scaled in step 310.

The archived data can be unfolded in accordance with a particular unfolding technique. The unfolding techniques generally involve unfolding the three way array of archived data slice by slice and arranging them in a generally sequential manner. Schematic illustrations of unfolding techniques according to embodiments of the invention are provided in FIGS. 10A-10C. The unfolding techniques of FIGS. 10A-10C generally involve slicing a three way data matrix (across an x-axis, a y-axis, and a z-axis) and arranging the slices either one below the other or side by side. The stated data unfolding techniques give six (6) different data arrangements in two way array form.

Figure 10A:
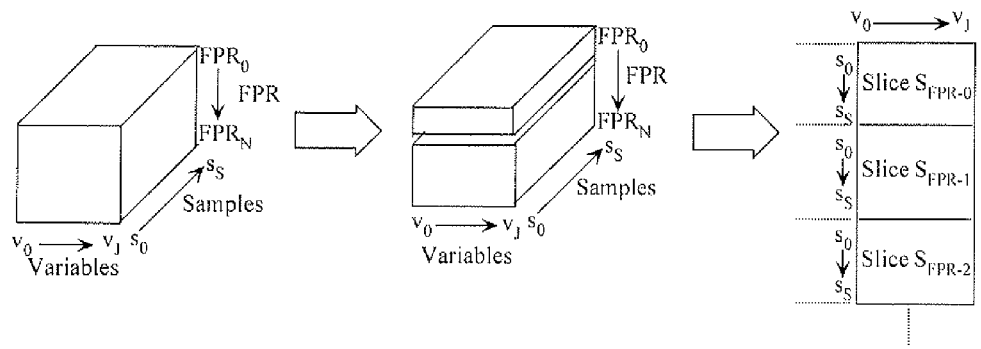
FIGS. 10A-10C provide schematic illustrations of data unfolding according to embodiments of the invention.

A first exemplary unfolding technique will now be described in relation to FIG. 10A. As shown in FIG. 10A, the first unfolding technique generally involves unfolding the three way array of archived data across an x-axis and arranging the horizontal slices one below the other or side by side (not shown). Each horizontal slice $S_{FPR\text{-}0}, \ldots, S_{FPR\text{-}N}$ includes data for a single fully performed run $FPR_0, \ldots, FPR_N$ of a batch process. The data contained in each horizontal slice $S_{FPR\text{-}0}, \ldots, S_{FPR\text{-}N}$ includes a set of samples $s_0, \ldots, s_S$ for each variable $v_0, \ldots v_J$. Each of the slices $S_{FPR\text{-}0}, \ldots, S_{FPR\text{-}N}$ is arranged in a substantially sequential manner based on the batch process run number 0-N.

Figure 10B:
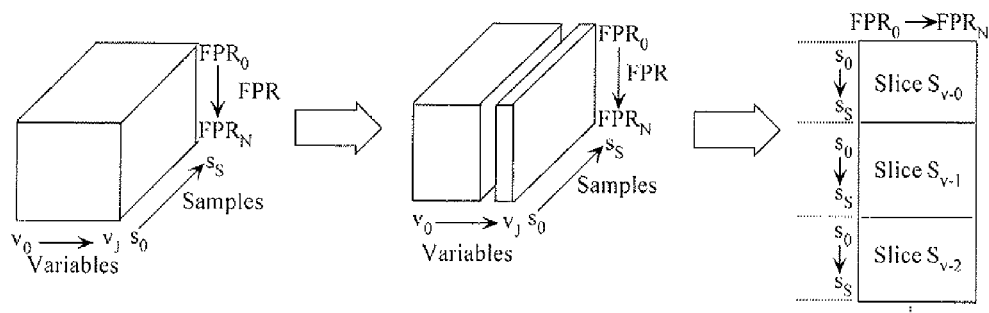

A second exemplary unfolding technique will now be described in relation to FIG. 10B. As shown in FIG. 10B, the second unfolding technique generally involves unfolding the three way array of archived data across a y-axis and arranging the slices one below the other or side by side (not shown). Each vertical slice $S_{v\text{-}0}, \ldots, S_{v\text{-}J}$ includes data for a single variable $v_0, \ldots v_J$. The data contained in each vertical slice $S_{v\text{-}0}, \ldots, S_{v\text{-}N}$ includes sets of samples $s_0, \ldots, s_S$ for each fully performed run $FPR_0, \ldots, FPR_N$ of a batch process. Each of the slices $S_{v\text{-}0}, \ldots, S_{v\text{-}J}$ is arranged in a substantially sequential manner based on the variable number 0-J.

Figure 10C:
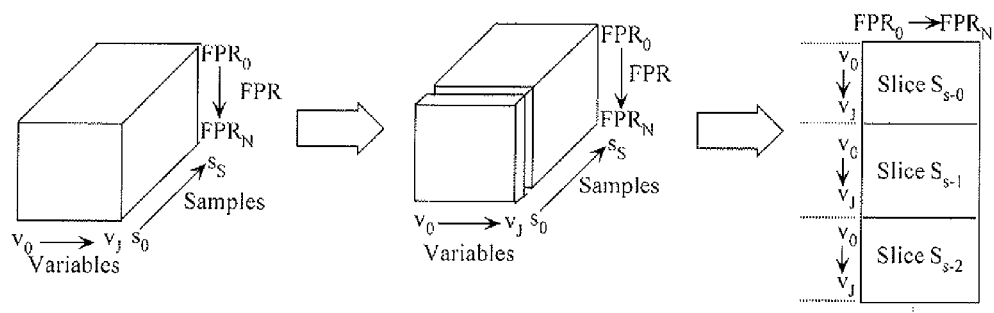

A third exemplary unfolding technique will now be described in relation to FIG. 10C. As shown in FIG. 10C, the third unfolding technique generally involves unfolding the three way array of archived data across a z-axis and arranging the slices one below the other or side by side (not shown). Each vertical slice $S_{s\text{-}0}, \ldots, S_{s\text{-}S}$ includes data representing values for a particular sample $s_0, \ldots, s_S$ of the variables $v_0, \ldots v_J$. Each of the values represents a value obtained during a certain point of a fully performed run $FPR_0, \ldots, FPR_N$ of a batch process. Each of the slices $S_{s\text{-}0}, \ldots, S_{s\text{-}S}$ is arranged in a substantially sequential manner based on the sample number 0-S.

It should be noted that each of the above described exemplary unfolding techniques results in a two way array of data. Since the runs $FPR_0, \ldots, FPR_N$ of a batch process can have different lengths (or durations), the two way array of data gives rise to the matrix shown in mathematical equation (1).

$$[X]_{I \times JK} = \begin{pmatrix} \frac{Time\ K=1}{v_1 v_2 \ldots v_J} & \frac{K=2}{v_1 v_2 \ldots v_J} & \ldots & \frac{K=K_1-1}{v_1 v_2 \ldots v_J} & \frac{K=K_1}{v_1 v_2 \ldots v_J} \\ \frac{Time\ K=1}{v_1 v_2 \ldots v_J} & \frac{K=2}{v_1 v_2 \ldots v_J} & \ldots & \frac{K=K_2-2}{v_1 v_2 \ldots v_J} & \frac{K=K_2-1}{v_1 v_2 \ldots v_J} & \frac{K=K_2}{v_1 v_2 \ldots v_J} \\ \vdots & \vdots & \ddots & \vdots & & \\ \frac{Time\ K=1}{v_1 v_2 \ldots v_J} & \frac{K=2}{v_1 v_2 \ldots v_J} & \ldots & \frac{K=K_I}{v_1 v_2 \ldots v_J} & & \end{pmatrix} \quad (1)$$

As shown in mathematical equation (1), each run $FPR_0, \ldots, FPR_N$ can have a different length (or total duration). As such, the performance of each run $FPR_0, \ldots, FPR_N$ can result in a different number of sets of values for the variables $v_0, \ldots v_J$. Accordingly, embodiments of the present invention use wavelet based approximation techniques for handling the varying batch lengths (or total durations). An exemplary wavelet based approximation technique is described below in relation to steps 312-317 of FIG. 3A and steps 318-322 of FIG. 3B. However, it should be understood that wavelet based approximation techniques can approximate sharp changes in time profiles for the variable $v_0, \ldots, v_J$. Wavelet based approximation techniques can also approximate discontinuities present in the time profiles for the variable $v_0, \ldots, v_J$.

Referring again to FIG. 3A, method 300 continues with step 312. In step 312, a run (e.g., $FPR_0$) of the batch process is selected for which a feature matrix FM is to be determined. Subsequent to completing step 312, step 313 is performed where a variable (e.g., $v_0$) is selected. In step 314, a set of wavelet coefficients $WC_0, \ldots, WC_J$ is determined for the selected variable (e.g., $v_0$) by performing discrete wavelet transform (DWT) using time domain data. The set of wavelet coefficients $WC_0, \ldots, WC_J$ represents a time series for the variable (e.g., $v_0$) of the selected run (e.g., $FPR_0$).

The following wavelet transformation discussion is provided to assist a reader in understanding how a time series for a variable is mapped onto wavelet space. The wavelet transformation decomposes a data-set or a function into a number of different frequency components with a resolution matched to its scale. In other words, the resolution is a function of the scale (inverse of frequency) at which the data is being analyzed. It uses simple, fixed building blocks termed wavelets that are generated from a single fixed function, the 'mother' wavelet using translation and dilation operations. The wavelet transform of a function $f(t)$ is defined by mathematical equation (2) as the projection of this function onto a set of functions termed wavelets.

$$\psi_{a,b}(t) = \frac{1}{\sqrt{a}} \psi\left[\frac{t-b}{a}\right] \quad (2)$$

where a and b represent the dilation and translation parameters, respectively. $\psi(t)$ is the mother wavelet. $\psi(t)$ is localized in both the time and frequency domain. The coefficient, $1/\sqrt{a}$, ensures that the information in the scaled and translated versions are the same as the mother wavelet thereby guaranteeing that the information contained in the data is retained after it has been transformed. The scaling operation is fundamentally the stretching and/or compressing of the mother wavelet, thereby enabling the different frequency information in the function to be analyzed. The compression operation is used to fit the high frequency component of a function while the stretching operation is used to fit the low frequency component. The translation operation is used to capture the time information of the function. Therefore given a function $f(t)$, the wavelet coefficients are obtained through a convolution operation defined by mathematical equation (3).

$$W(a, b) \equiv \int_{\infty}^{\infty} \psi_{a,b}(t) f(t) dt \tag{3}$$

where $\psi_{a,b}(t)$ is as defined in equation (2).

A discussion of how the sets of values can be determined using a wavelet based analysis is provided below in relation to FIG. 4. It should be noted that each of the sets of values determined using a wavelet based analysis includes wavelet coefficients for a plurality of frequency-scales of signals. It should also be noted that step 314 of FIG. 3A is performed for approximating and compactly representing the time profile data of the variable $v_0, \ldots, v_J$ of the selected fully performed run. The data compression generally results in faster data processing times and less complex computations using the archived data. The wavelet based approximation also simplifies the task of handling varying correlation structure that is typical of batch trajectories, which is well known to those having ordinary skill in the art.

After completing step 314, method 300 continues with a decision step 315. If a set of wavelet coefficients $WC_0, \ldots, WC_J$ has not been determined for each variable $v_0, \ldots, V_J$ [315:NO], then step 316 is performed. In step 316, a next variable (e.g., $v_1$) is selected. Subsequent to selecting the next variable, method 300 returns to step 314. If a set of wavelet coefficients $WC_0, \ldots, WC_J$ has been determined for each variable $v_0, \ldots, V_J$ [315:YES], then step 317 is performed. In step 317, a feature matrix FM is built for the selected run (e.g., $FPR_0$) by tabulating the coefficient values. The feature matrix FM comprises a plurality of feature vectors. The phrase "feature vector", as used herein, refers to wavelet coefficients contained in the feature matrix FM. The feature matrix FM has a size defined by the following mathematical equation (4).

$$Size_{FV} = (N_{SCALES} + 1) \cdot (N_{VARIABLES}) \tag{4}$$

where $Size_{FV}$ is the size of the feature matrix FM. $N_{SCALES}$ is the number of frequency-scales of a signal. $N_{VARIABLES}$ is the number of variables contained within the selected data segment (e.g., $S_0$).

Figure 3B:
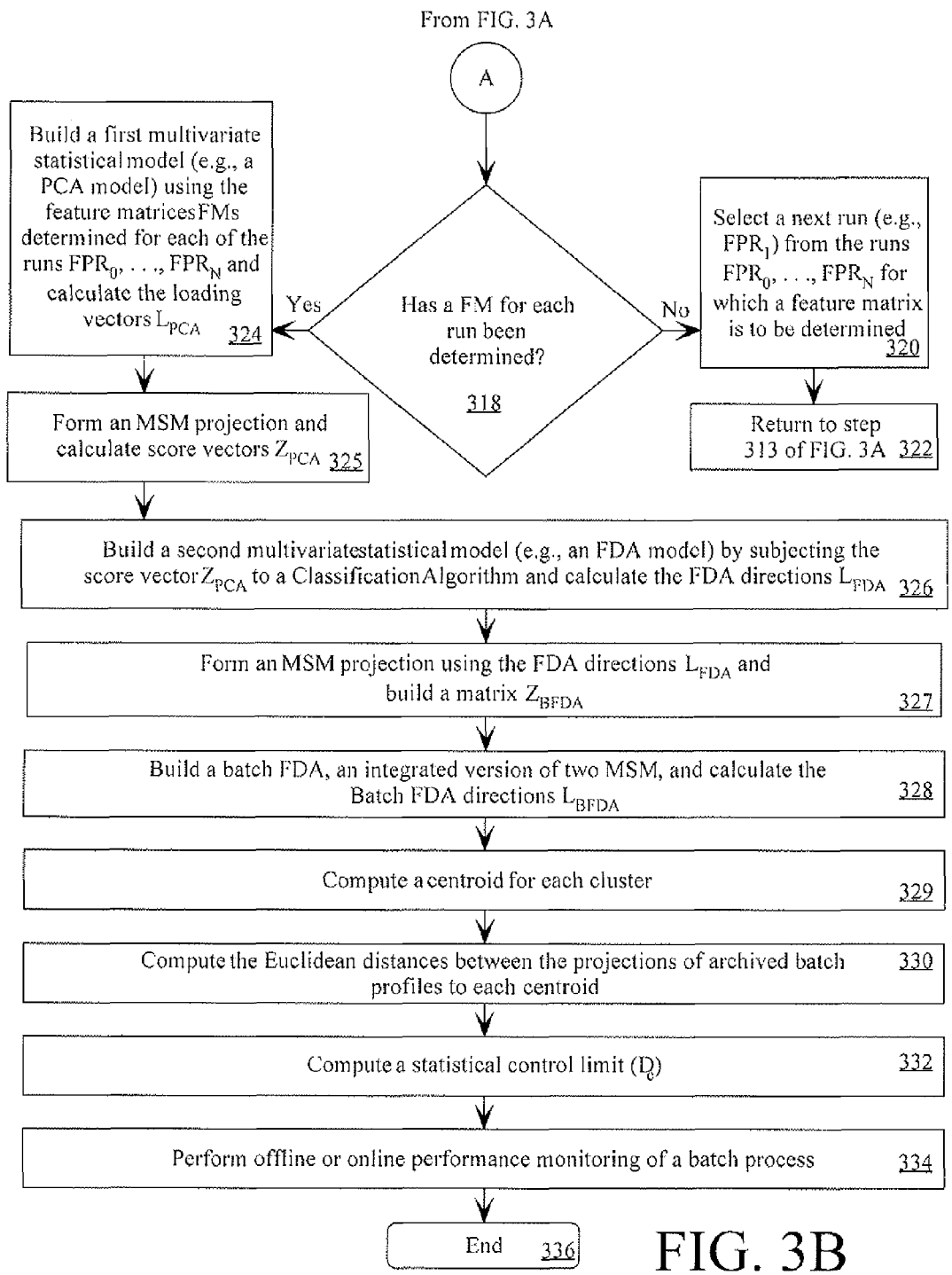

Subsequent to completing step 317, method 300 continues with a decision step 318 of FIG. 3B. If a feature matrix FM for each of the fully performed runs $FPR_0, \ldots, FPR_N$ has not been determined [318:NO], then method 300 continues with step 320. Step 320 involves selecting a next fully performed run (e.g., $FPR_1$) for which a feature matrix is to be determined. After selecting the next fully performed run (e.g., $FPR_1$), step 322 is performed where the method 300 returns to step 313 of FIG. 3A.

If a feature matrix FM for each of the fully performed runs $FPR_0, \ldots, FPR_N$ has been determined [318:YES], then method 300 continues with steps 324. In step 324, the FM of each batch run is unfolded to convert the three way array coefficient data into two way array data. If the unfolded data matrix have fewer samples (batch runs) than the variables, then a co-linearity problem could arise. For example, if the number of rows ($FPR_0, \ldots, FPR_N$) is substantially smaller than the number of columns (wavelet coefficients), then a co-linearity problem arises in traditional multivariate statistical analysis based algorithms (e.g., a conventional FDA algorithm). To overcome the co-linearity problem, a modified version of a multivariate statistical analysis (MSA) based algorithm is implemented by embodiments of the present invention. This MSA based algorithm generally involves (a) performing a multivariate statistical analysis to build a multivariate statistical model (e.g., a PCA model) in terms of wavelet coefficients and (b) performing an FDA algorithm to build an FDA model that is to be used in assessing the performance of a fully performed run or current run of a batch process. The modified MSA based algorithm will be explained in detail below with reference to steps 324-326.

Step 324 involves building a first multivariate statistical model (e.g., a PCA model) using the feature vectors contained in the feature matrices FMs determined for each of the runs $FPR_0, \ldots, FPR_N$. As noted above, the first multivariate statistical model can be built based on a multivariate statistical method. Such multivariate statistical methods include, but are not limited to, Principal Component Analysis (PCA) based methods and Partial Least Squares (PLS) based methods. The multivariate statistical methods are basically data projection methods, which project the high dimensional data onto lower dimensions without losing much information. Each of the listed multivariate statistical analysis methods is well known to those having ordinary skill in the art, and therefore will not be described herein. This statistical model building step generates new directions $L_{PCA}$ for the lower dimensions onto which the high dimensional data contained in an FM are projected. These new directions $L_{PCA}$ are called loading vectors. This new set of directions $L_{PCA}$ defines the statistical model.

After calculating the loading vectors $L_{PCA}$, step 325 is performed. Step 325 involves forming an MSM projection by projecting the feature vectors FVs onto the built multivariate statistical model (e.g., PCA model). After projecting the feature vectors FVs onto the multivariate statistical model, step 325 involves calculating score vectors $Z_{PCA}$ of the projected feature vectors FVs using information from the MSM projection. Score vectors $Z_{PCA}$ are the result of such projections of the high dimensional data onto the statistical model (e.g., PCA model) directions.

Upon completing step 325, method 300 continues with step 326. In step 326, a second multivariate statistical model is build for normal batch operations to assess the performance of a fully performed run or current run of a batch process. The second multivariate statistical model can be built by performing a multivariate statistical analysis using the score vectors $Z_{PCA}$. The multivariate statistical analysis algorithm can be a classification algorithm, such as an FDA based algorithm configured to provide discrimination boundaries among the classes. The second MSM is characterized by a matrix $L_{FDA}$ that represents the set of new directions that provide discrimination. Notably, c–1 FDA directions $L_{FDA}$ are retained, where c is an integer representing the number of clusters 902, . . . , 918.

Referring again to FIG. 3B, method 300 continues with step 327. In step 327, an FDA projection is formed by projecting the score vectors $Z_{PCA}$ on $L_{FDA}$ FDA directions. After projecting the score vectors $Z_{PCA}$ onto the second multivariate statistical model (e.g., FDA model), step 327 involves building a matrix $Z_{BFDA}$ of the projected feature vectors FVs using information from the second MSM projection.

Figure 11:
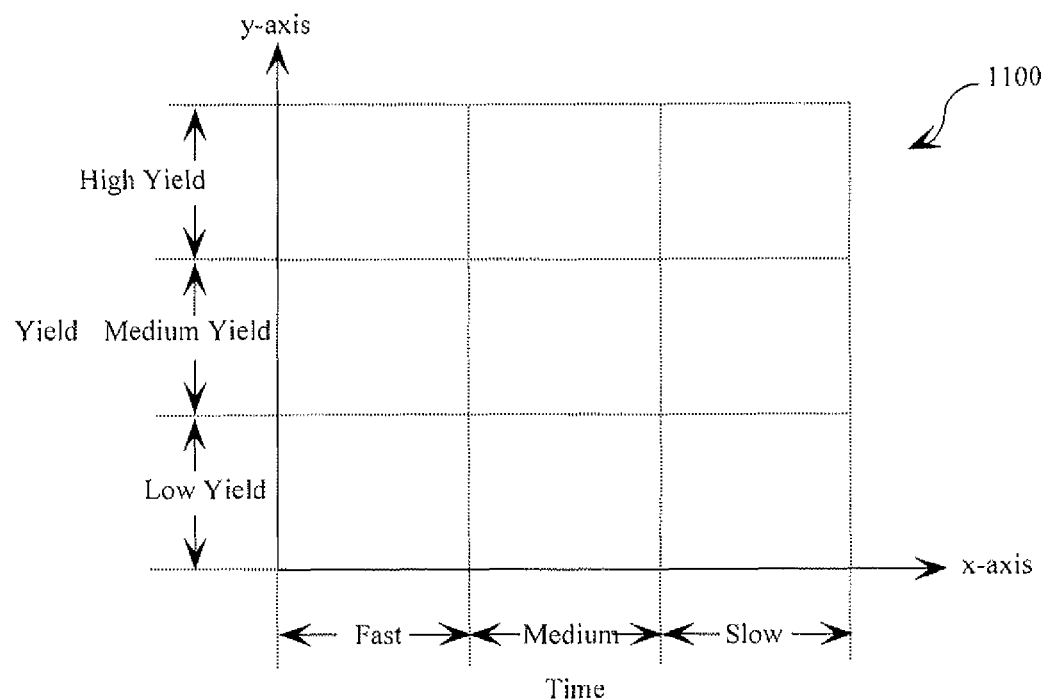
FIG. 11 is a conceptual illustration of exemplary classes that serve as a starting point for building a multivariate statistical model according to an embodiment of the invention.
Figure 12:
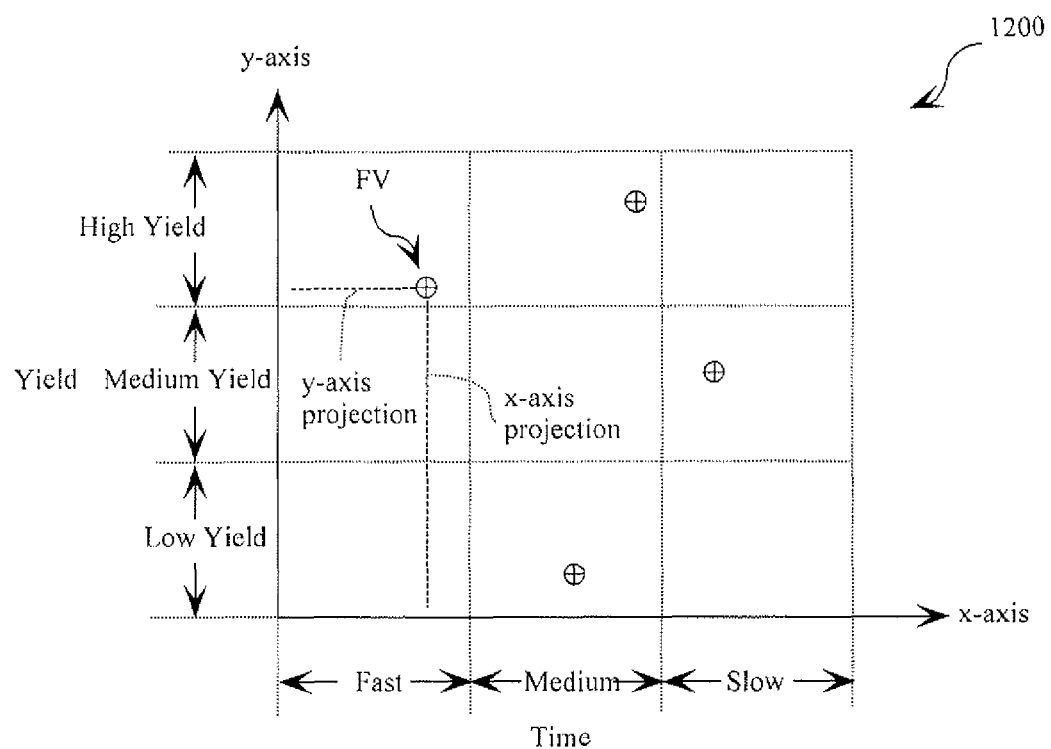
FIG. 12 is a conceptual illustration of an exemplary multivariate statistical model projection method for a two-dimensional case according to an embodiment of the invention.

According to an embodiment of the present invention, the second multivariate statistical model is built using an FDA based method. A conceptual illustration of the classes 1100 that serve as a starting point for building the FDA model is provided in FIG. 11. As shown in FIG. 11, the FDA classes 1100 can comprise a two-dimensional graph having a y-axis and an x-axis for the case of two (2) batch attributes. The y-axis includes values (not shown) representing batch attribute values (e.g., yield values). The x-axis includes values (not shown) representing the other batch attributes (e.g., batch run-time values). Associated with each point in the classes of FIG. 11 is a feature vector that also belongs to the FM. The FDA algorithm generates a new set of directions such that the points in each of the classes are discriminated in the new space to the maximal extent possible. This discrimination results because of a separation of the classes as well as a compression of the class spread in the new space. A conceptual illustration of an exemplary FDA projection method 1200 is provided for a two-dimensional case in FIG. 12. In the projected space, it is expected that the FVs are maximally resolved or discriminated. Therefore, the FDA is expected to provide a clearer resolution or discrimination of the FVs in the new space when compared with the representation of FVs in the original measurement space. Embodiments of the present invention are not limited in this regard.

Referring again to FIG. 3B, method 300 continues with step 328. In step 328, an integrated version of two multivariate statistical models is built using the first and second multivariate statistical models. As the integrated version of multivariate statistical model is a modified version the traditional FDA algorithm, it is described as a Batch FDA (BFDA) model. The BFDA model is characterized by a new sets of direction $L_{BFDA}$ defined by mathematical equation (5).

$$L_{BFDA} = L_{PCA} \times L_{FDA} \qquad (5)$$

Alternatively, the score vector $Z_{BFDA}$ can also be calculated by projecting the FVs on $L_{BFDA}$ directions. The score vector $Z_{BFDA}$ and the loading matrix $L_{BFDA}$ are provided for use in a subsequent offline and/or online performance monitoring process. In this regard, it should be understood that the $L_{BFDA}$ can be stored in a memory device of a server 102 (described above in relation to FIG. 1) or an OCS 104 (described above in relation to FIGS. 1-2). The purpose of the score vector $Z_{BFDA}$ will become more evident as the discussion progresses. However, it should be understood that the score vector $Z_{BFDA}$ is generally a projection of the $Z_{PCA}$ onto the matrix $L_{BFDA}$.

In step 329, a centriod $C_{902}, \ldots, C_{918}$ for each of the clusters 902, ..., 918 is computed in a Batch Fischer discriminate analysis (BFDA) space. The term "centroid", as used herein, refers to mean profiles of a cluster 902, ..., 918. The centroids $C_{902}, \ldots, C_{918}$ can be used to assess the performance of a desired fully performed run of a batch process or current run of the batch process. In this regard, it should be understood that the centroids $C_{902}, \ldots, C_{918}$ can be stored in a memory device of a server 102 (described above in relation to FIG. 1) or an OCS 104 (described above in relation to FIGS. 1-2). The cluster prototype profiles (characterized in step 309) can also be used to assess the performance of a desired fully performed run of a batch process or current run of the batch process.

Thereafter, steps 330, 332, and 334 are performed. In step 330, the Euclidean distances between the projections of archived batch profiles on BFDA space ($Z_{BFDA}$) to each centroid $C_{902}, \ldots, C_{918}$ are computed. In step 332, a statistical control limit $D_c$ is computed based on a threshold analysis of the distances. If the cluster prototypes are used in place of the centroids, then the Euclidean distances are calculated between the BFDA projections of archived batch profiles and cluster prototypes. The mean distance for all clusters is calculated and taken as a distance measure of the batch profiles to that cluster. The Euclidean distances are used to measure the closeness of a point to the centroid. However, it should be understood that any known method for computing closeness of a point can be used herein without limitation. The batch profiles are assigned to the cluster 902, ..., 918 corresponding to the minimum Euclidean distance. The corresponding minimum Euclidean distance is termed as the signature distance of the present invention. An exemplary method for statistical control limit calculation will be described below in relation to FIGS. 6A-6B. In step 334, an offline or online performance monitoring of a batch process is performed. An exemplary method for offline performance monitoring of a batch process will be described below in relation to FIG. 7. Similarly, an exemplary method for online performance monitoring of a batch process will be described below in relation to FIGS. 8A-8B. Subsequent to completing the performance monitoring of the batch process, step 336 is performed where the method 300 ends.

Figure 4:
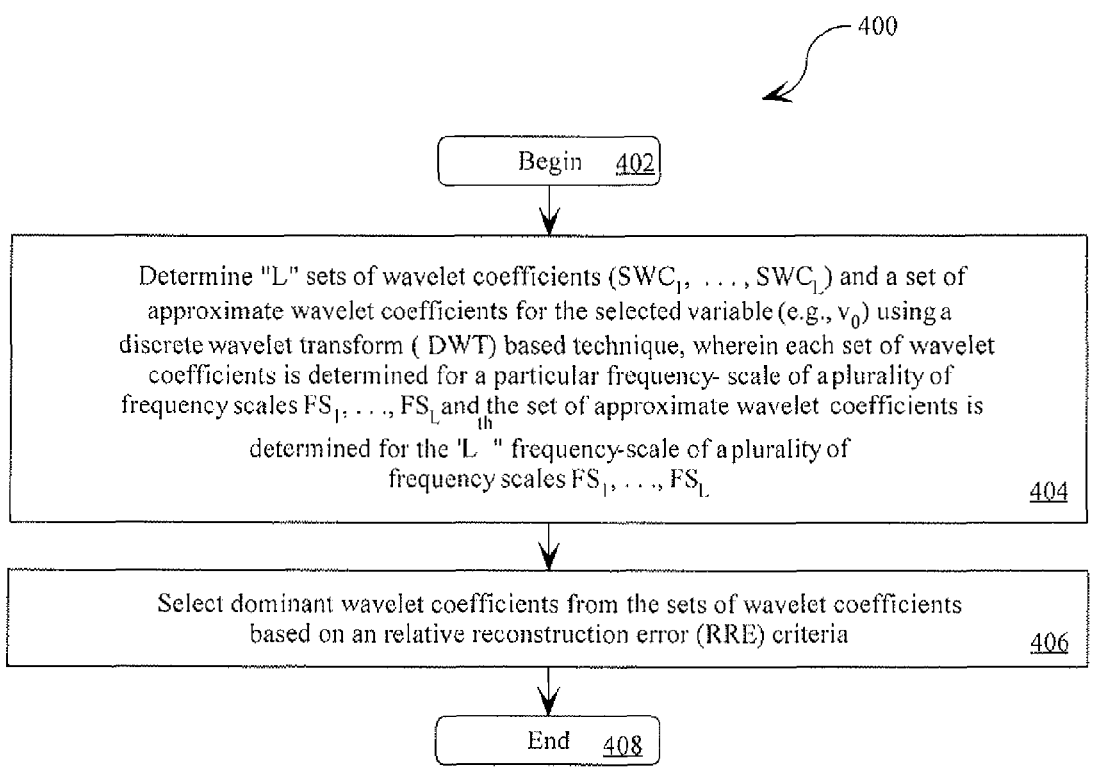
FIG. 4 is a flow diagram of a method for determining a set of values using wavelet based analysis according to an embodiment of the invention.

Referring now to FIG. 4, there is provided a flow diagram of a method 400 for determining sets of wavelet coefficients $WC_0, \ldots, WC_J$ using a wavelet based analysis. Method 400 can be performed in step 314 of FIG. 3A for purposes of approximating and compactly representing a variables $v_0, \ldots, v_J$ of a selected fully performed run (e.g., $FPR_0$).

A wavelet based analysis can involve determining an approximation of the time profiles of the signal associated with variables $v_0, \ldots, v_J$. It should be noted that a wavelet coefficient at a given time and frequency-scale is obtained by taking an inner product of time-series and the wavelet function defined at the given time and frequency-scale. As such, wavelet coefficients generally represent a contribution or strength of the time series for a variable at the given time and frequency-scale. Frequency-scales are obtained by the performance of a wavelet transform decompose (WTD) process. The WTD process generally involves wavelet transform decomposing a given time series into different frequency (or scales) bands. Thus, a time profile of the signal can be represented by an inner product of wavelet coefficients with wavelet basis functions. The time profile approximation of the signal can be defined by the following mathematical equation (6).

$$f(t) \equiv \sum_{n=0}^{n} c_n \otimes \Phi_n \qquad (6)$$

where $f(t)$ is a time domain representation of a signal. n represents frequency-scales of the signal. $c_n$ represents values of wavelet coefficients for each frequency-scale of the signal. $\Phi_n$ represents wavelet functions for each frequency-scale of the signal. As should be understood, the circled "x" operator of mathematical equation (6) is a tensor product operator.

Accordingly, a time series of the signal can be represented as a set of values including wavelet coefficients $c_n$ for each frequency-scale of the signal. As such, method 400 generally involves applying a wavelet transform to a variable $v_0, \ldots, v_J$ to (a) determine a plurality of frequency-scales and (b) determine wavelet coefficients $c_n$ for each of the frequency-scales. Embodiments of the present invention are not limited in this regard.

Referring again to FIG. 4, method 400 begins with step 402 and continues to step 404. In step 404, "L" sets of wavelet coefficients $SWC_1, \ldots, SWC_L$ for a selected variable (e.g., $v_0$) are determined. The "L" sets of wavelet coefficients $SWC_1, \ldots, SWC_L$ can generally be determined using a Discrete Wavelet Transform (DWT) scheme with a number of levels L. If the DWT scheme is employed with a number of levels L, then each of the sets of wavelet coefficients is determined for a particular frequency-scale of a plurality of frequency-scales $FS_0, \ldots, FS_L$. Step 404 also involves determining a set of approximate wavelet coefficients for the selected variable (e.g., $v_0$). The set of approximate wavelet coefficients can also generally be determined using the Discrete Wavelet Transform (DWT) scheme with a number of levels L. If the DWT scheme is employed with a number of levels L, then the set of approximate wavelet coefficients is determined for the "$L^{th}$" frequency-scale of the plurality of frequency-scales $FS_0, \ldots, FS_L$. Embodiments of the present invention are not limited in this regard. For example, a Stationary Wavelet Transform (SWT) scheme can also be used to wavelet transform the variables $v_0, \ldots v_J$ of a fully performed run. SWT and DWT schemes are well known to those having ordinary skill in the art, and therefore will not be described in herein.

After completing step 404, method 400 continues with step 406. In step 406, a selection is made. In particular, the dominant wavelet coefficients are selected from the "L" sets of wavelet coefficients $SWC_1, \ldots, SWC_L$ and the set of approximate coefficients $SWC_{L+1}$ based on relative reconstruction error (RRE) criteria. The selection is done based on relative and/or absolute importance of particular wavelet coefficients. An exemplary method for selecting the dominant wavelet coefficients will be described below in relation to FIG. 5. Upon completing step 406, step 408 is performed where method 400 ends. The selected coefficients corresponding to "L" frequency scales and the selected approximate wavelet coefficients form the feature vector of the selected variable profile.

Figure 5:
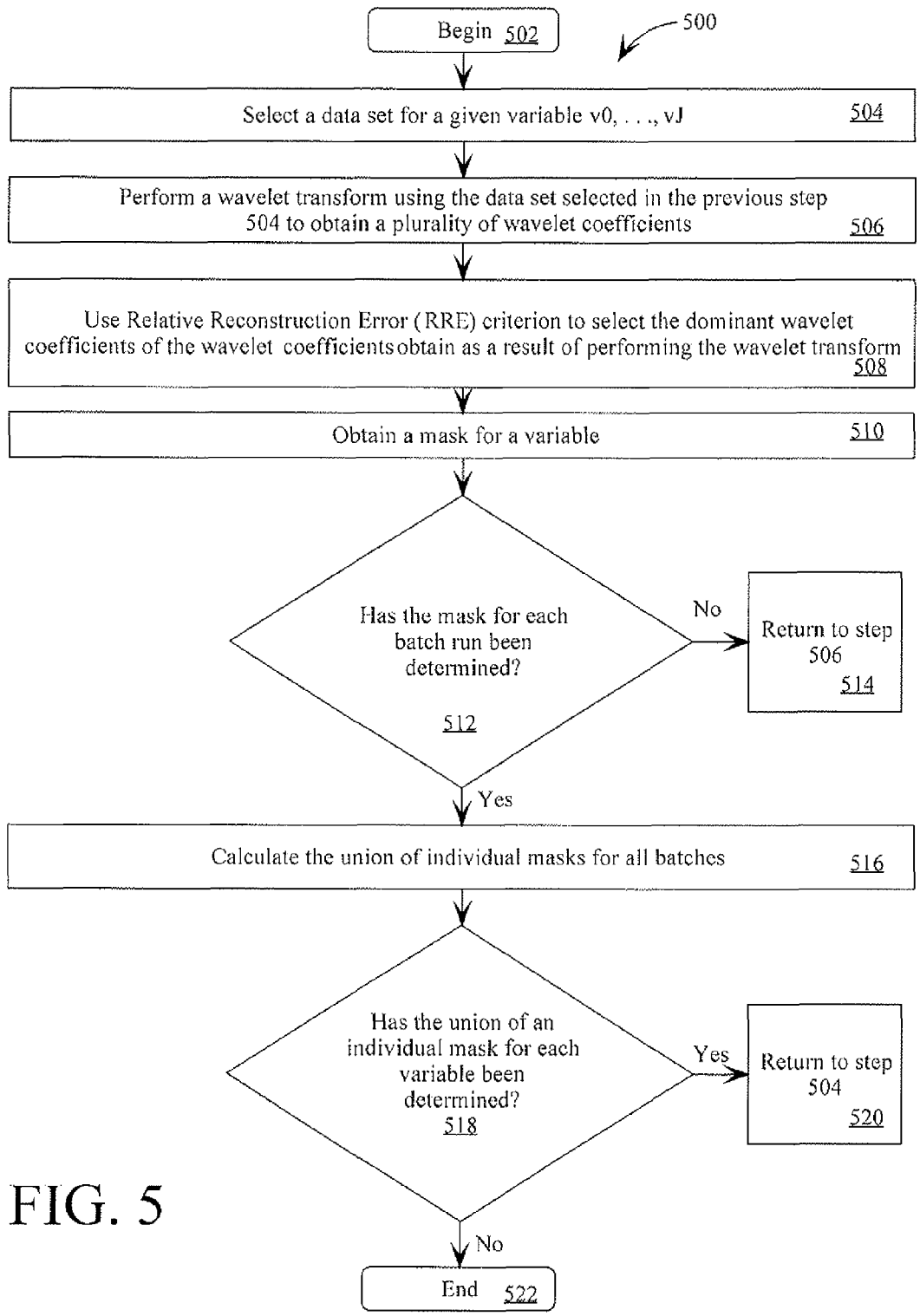
FIG. 5 is a flow diagram of a method for selecting the optimal number of wavelet coefficients according to an embodiment of the invention.

Referring now to FIG. 5, there is provided a flow diagram of a method 500 for selecting the optimal number of wavelet coefficients. As shown in FIG. 5, method 500 begins with step 502 and continues with step 504. In step 504, a data set is selected for a given variable $v_0, \ldots, v_J$. Thereafter, step 506 is performed. In step 506, a discrete wavelet transform is performed on the data set selected in the previous step 504 to obtain a plurality of wavelet coefficients. After obtaining the wavelet coefficients, step 508 is performed where the dominant wavelet coefficients are selected using a Relative Reconstruction Error (RRE) criterion.

According to embodiments of the invention, step 508 involves determining an optimal number $O_{NUM}$ of wavelet coefficients. This determination can be provided by selecting a plurality of $N_C$ values for wavelet coefficients and computing relative reconstruction error (RRE) using the $N_C$ values, wherein each of the $N_C$ value is an integer representing a number of wavelet coefficients. An RRE computation can be defined by the following mathematical equation (7).

$$RRE(C) = w \cdot nMSE + \frac{(1-w) \cdot C}{N} \qquad (7)$$

where $RRE(N_C)$ is the relative reconstruction error determined using $N_C$. w is a weight having a value between zero (0) and one (1), inclusively (i.e., $0 \leq w \leq 1$). nMSE is a normalized mean squared error. N is the total number of wavelet coefficients. The RRE computations are iteratively performed for the plurality of values of $N_C$. Thereafter, the RRE computation resulting in the lowest $RRE(N_C)$ value is determined.

The $N_C$ value for the RRE computation having the lowest $RRE(N_C)$ value is selected as the optimal number $O_{NUM}$ of wavelet coefficients. Upon determining the optimal number $O_{NUM}$ of wavelet coefficients, $O_{NUM}$ wavelet coefficients are retained, wherein the wavelet coefficients have the most significant of the magnitudes for the wavelet coefficients. The $O_{NUM}$ wavelet coefficients provide a set of wavelet coefficients representing a time series for the particular variable (e.g., $v_0$). The bases for the $O_{NUM}$ wavelet coefficients are determined. These determined bases define an optimum set of basis for the particular variable (e.g., $v_0$). Embodiments of the present invention are not limited in this regard.

Referring again to FIG. 5, method 500 continues with step 510. In step 510, a mask for the selected variable is obtained. A mask is a vector having entries zero (0) or (1). The location of the wavelet coefficient, which was retained in the previous step 508, is annotated as one (1) and reset to zero (0).

Upon completing step 510, method 500 continues with a decision step 512. If the mask for each fully performed run $FPR_0, \ldots, FPR_N$ has not been determined [512:NO], then step 514 is performed where method 500 continues to step 506. However, if the mask for each fully performed run $FPR_0, \ldots, FPR_N$ has been determined [512:YES], then step 516 is performed. In step 516, the union of individual masks for all batches is calculated. The union of the masks represents the wavelet basis function which should be retained. This is used in offline and online performance monitoring. After completing step 516, method 500 continues with a decision step 518. If the union of the individual mask for each variables has been determined [518:YES], then step 520 is performed where method 500 returns to step 504. However, if the union of the individual mask for each variable has not been determined [518:NO], then step 522 is performed where method 500 ends.

Figure 6A:
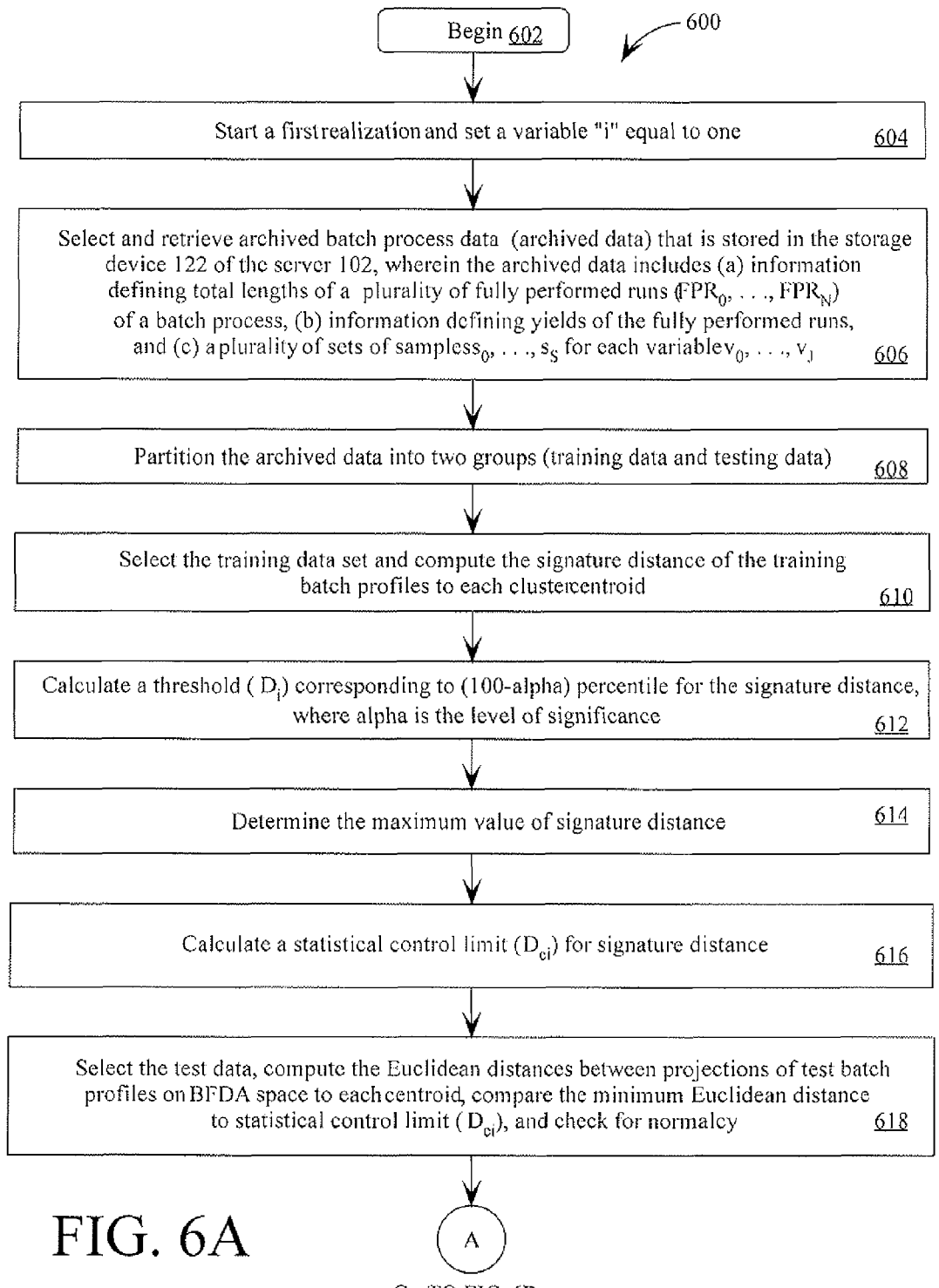
FIGS. 6A-6B collectively provide a flow diagram of a method for calculating a control limit $D_c$ according to an embodiment of the invention.
Figure 6B:
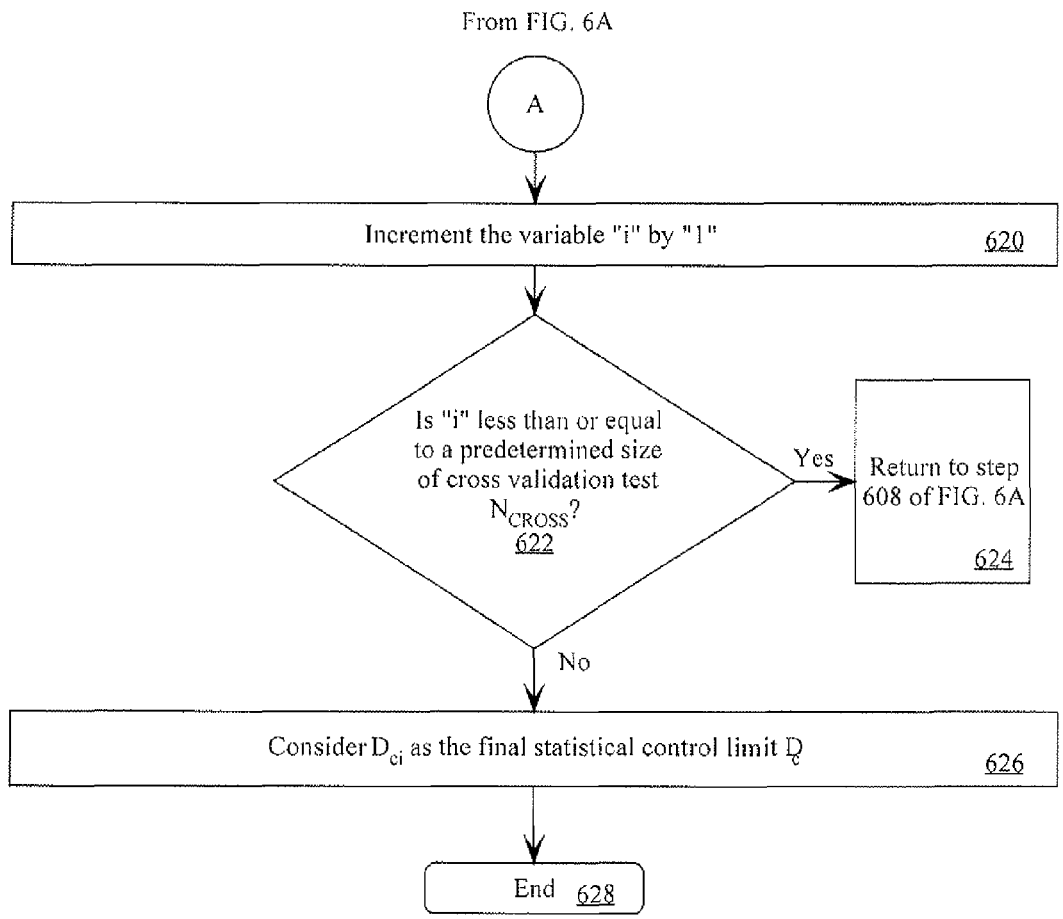

Referring now to FIG. 6A-6B, there is provided a flow diagram of a method 600 for calculating a control limit $D_c$ according to an embodiment of the invention. As shown in FIG. 6A, method 600 begins with step 602 and continues with step 604. In step 604, a first realization (i=1) is started. Thereafter, step 606 is performed where archived batch process data is selected. The archived data is stored historical data that was obtained during a plurality of actual or simulated runs of a batch process. The archived data can be stored in memory device 122 of server 102 (described above in relation to FIG. 1) in accordance with any suitable data storage format. As noted above, the archived data can include information defining the lengths of fully performed runs (FPRs) of a batch process. The archived data can also include information defining batch attributes (e.g., yields of the FPRs and/or stages of a batch of product). The archived data can further include a plurality of samples $s_0, \ldots, s_S$ of variables $v_0, \ldots, v_J$. Subsequent to selecting the archived data, it is retrieved from a storage device.

After selecting and retrieving the archived data, step 608 is performed. In step 608, the archived data is partitioned into two (2) groups, namely a training data group and a testing data group. In step 610, the training data set is selected. The calculation steps mentioned in FIGS. 3A-3B are followed to calculate the signature distance between the projection of training batch profiles on the BFDA space and each centriod 902, ..., 918. If the cluster prototypes are used in place of the centriods, then the Euclidean distances are calculated between the BFDA projections of archived batch profiles and cluster prototypes. The mean of the distances for the cluster prototypes is taken as distance measure of the batch profiles for that cluster. Subsequently, step 612 is performed where a threshold $D_t$ is calculated. The threshold $D_t$ corresponds to the "100-alpha" percentile for a signature distance. Alpha is the level of significance. In step 614, the maximum value $MaxD_i$ of the signature distance is determined among a plurality of thresholds $D_i$.

Upon completing step 614, method 600 continues with step 616. In step 616, a statistical control limit $D_{ci}$ for a signature distance is calculated in terms of the maximum value $MaxD_i$ of the signature distance using a statistical factor. Thereafter, the test data group is selected in step 618. A plurality of calculations are performed to calculate the Euclidean distance between projections of test batch profile on BFDA space and each centroid 902, ..., 918. Step 618 can further involve comparing the minimum Euclidean distance to the statistical control limit $D_{ci}$ and checking for normalcy.

Subsequent to completing step 618, method 600 continues with step 620 of FIG. 6B. In step 620, the variable "i" is incremented by one. Prior to starting a next iteration (or realization), a decision step 622 is performed. In step 622, a decision is made as to whether the variable "i" is less than or equal to a predetermined size of cross validation test $N_{CROSS}$. If the variable "i" is less than or equal to $N_{CROSS}$ [622:YES], then step 624 is performed. In step 624, method 600 returns to step 608 of FIG. 6A. If the variable "i" is greater than $N_{CROSS}$ [622:NO], then step 626 is performed. In step 626, the statistical control limit $D_{ci}$ for a signature distance is considered as the final statistical control limit $D_c$. Thereafter, step 628 is performed where method 600 ends.

Figure 7:
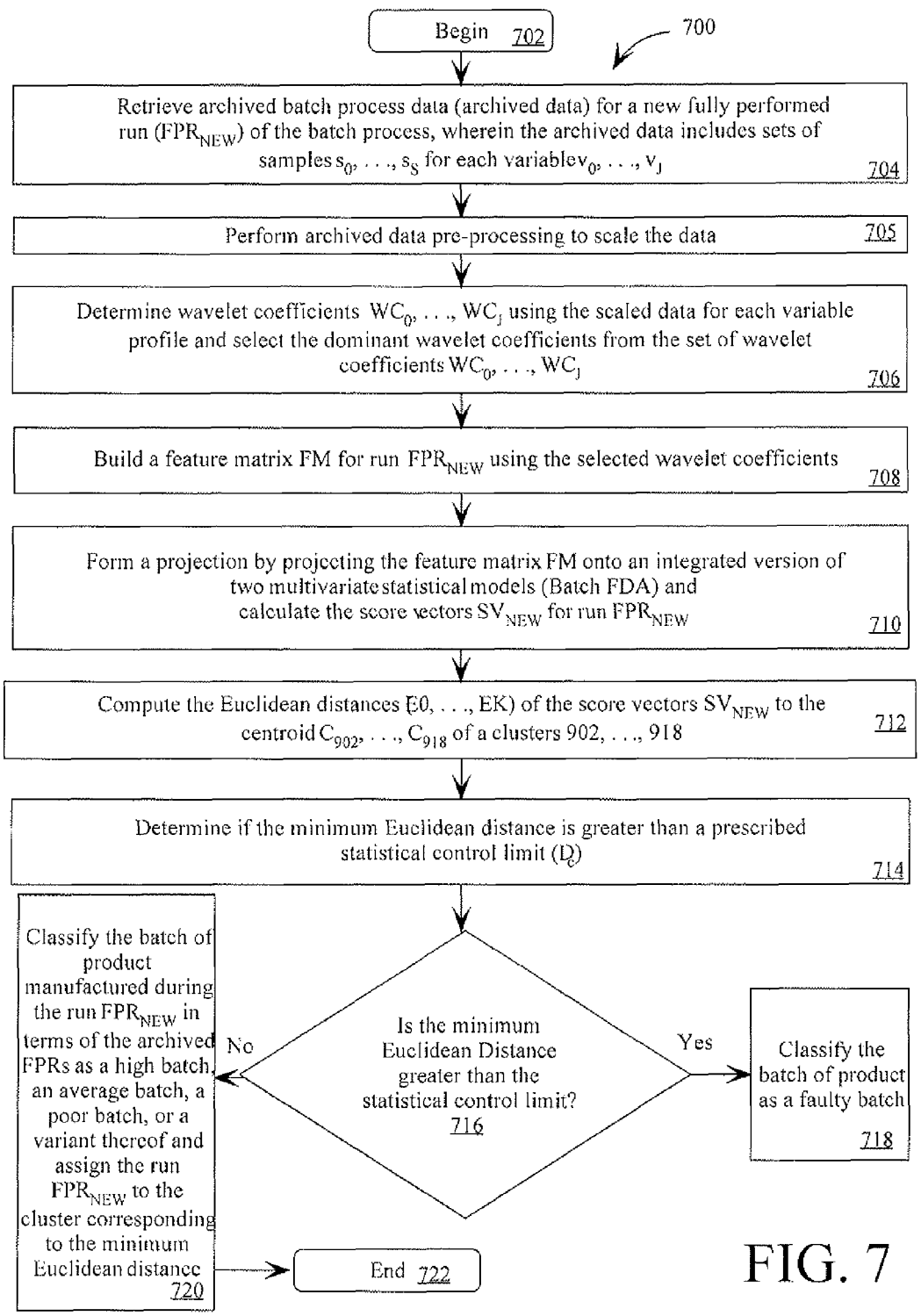
FIG. 7 is a flow diagram of a method for offline performance monitoring of a batch process according to an embodiment of the invention.

Referring now to FIG. 7, there is provided a flow diagram of a method 700 for performing an offline performance monitoring of a batch process. Notably, method 700 can be performed in step 334 of FIG. 3B. As shown in FIG. 7, method 700 begins with step 702 and continues with step 704. In step 704, archived data is retrieved for a new fully performed run $FPR_{NEW}$ of the batch process. The archived data includes sets of samples $s_0, \ldots, s_S$ for each variable $v_0, \ldots, v_J$. The archived data can be retrieved from memory device 122 of server 102 (described above in relation to FIG. 1). After retrieving the archived data, method 700 continues with step 705.

In step 705, the archived data is scaled using the same scaling method as was used in step 310 of FIG. 3A. The multivariate statistical analysis methods rely solely on data obtained during the performance of a batch process, i.e., the multivariate statistical analysis methods do not require knowledge of the batch process. The data used in the multivariate statistical analysis methods can include, but is not limited to, data representing process variable values (such as temperature values, pressure values, pH values, and concentration values). The measurement units of the each type of values are different. For example, the temperature values vary from three hundred degrees Kelvin (300 K) to four hundred degrees Kelvin (400 K). The pressure values vary from one pound per square inch (1 psi) to five pounds per square inch (5 psi). The pH values vary from five (5) to five and half (5.5). If the temperature, pressure, and pH values are used by the multivariate statistical analysis methods, then the multivariate statistical analysis methods are most sensitive to temperature and least sensitive to pH. This sensitivity characteristic of the multivariate statistical analysis methods is due to the fact that the change in temperature values is greater than the change in pH values. In order to equalize the contribution of each type of value, the data is scaled in step 705. After scaling the archived data, method 700 continues with step 706.

In step 706, wavelet coefficients $WC_0, \ldots, WC_J$ are determined using the scaled data for each variable profile. The wavelet coefficients $WC_0, \ldots, WC_J$ can generally be determined in the same or substantially similar manner as the wavelet coefficients determined in step 314 of FIG. 3A. As such, the description provided above in relation to step 314 of FIG. 3A is sufficient for understanding how the wavelet coefficients $WC_0, \ldots, WC_J$ are determined in step 706 of FIG. 7.

Subsequent to completing step 706, step 708 is performed. In step 708, a feature matrix FM is built using the wavelet coefficients $WC_0, \ldots, WC_J$ determined in the previous step 706. The feature matrix FM is generally built in the same or substantially similar manner as the feature matrix determined in step 317 of FIG. 3A. As such, the description provided above in relation to step 317 of FIG. 3A is sufficient for understanding how the feature matrix is determined in step 708 of FIG. 7.

After building the feature matrix FM, step 710 is performed. In step 710, a projection is formed by projecting the feature matrix FM onto an integrated version of two multivariate statistical models (e.g., the model built in the steps 328 of FIG. 3B). The integrated version of the two multivariate statistical models can be an BFDA model. The projection can be formed using the loading vectors $L_{BFDA}$ (described above in relation to FIG. 3B). Conceptual illustrations of exemplary projections are provided in FIGS. 13A-13B. Step 710 can also involve calculating score vectors $SV_{NEW}$ for run $FPR_{NEW}$. Notably, the score vectors $SV_{NEW}$ are the projections of $FPR_{NEW}$ onto BFDA space.

Figure 13A:
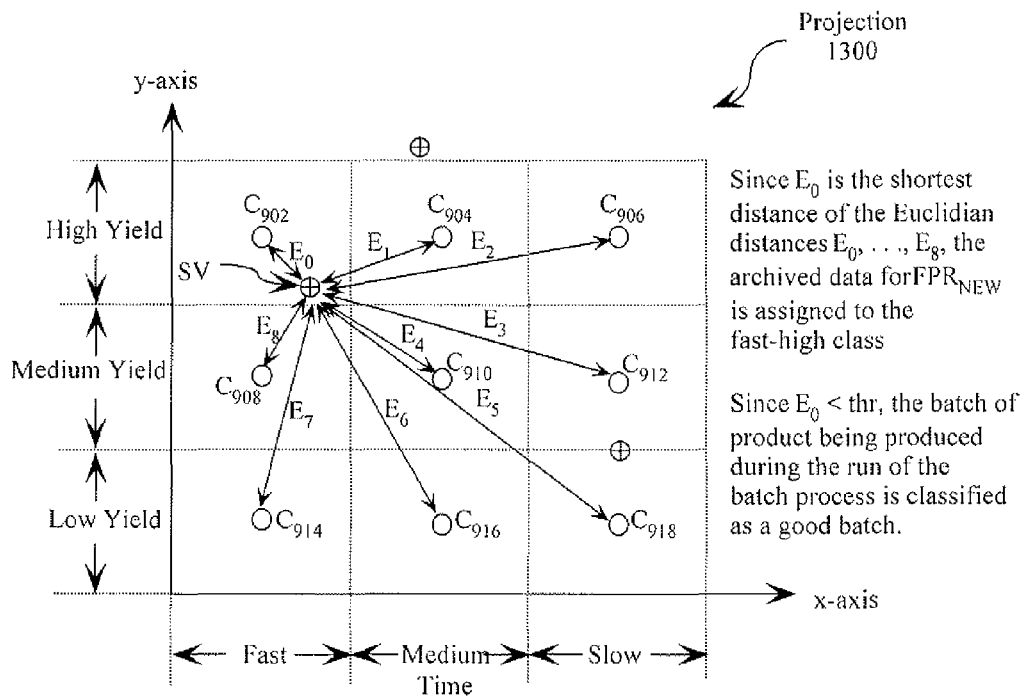
FIGS. 13A-13B are conceptual illustrations of Fisher Discriminant Analysis (FDA) projections according to embodiments of the invention.
Figure 13B:
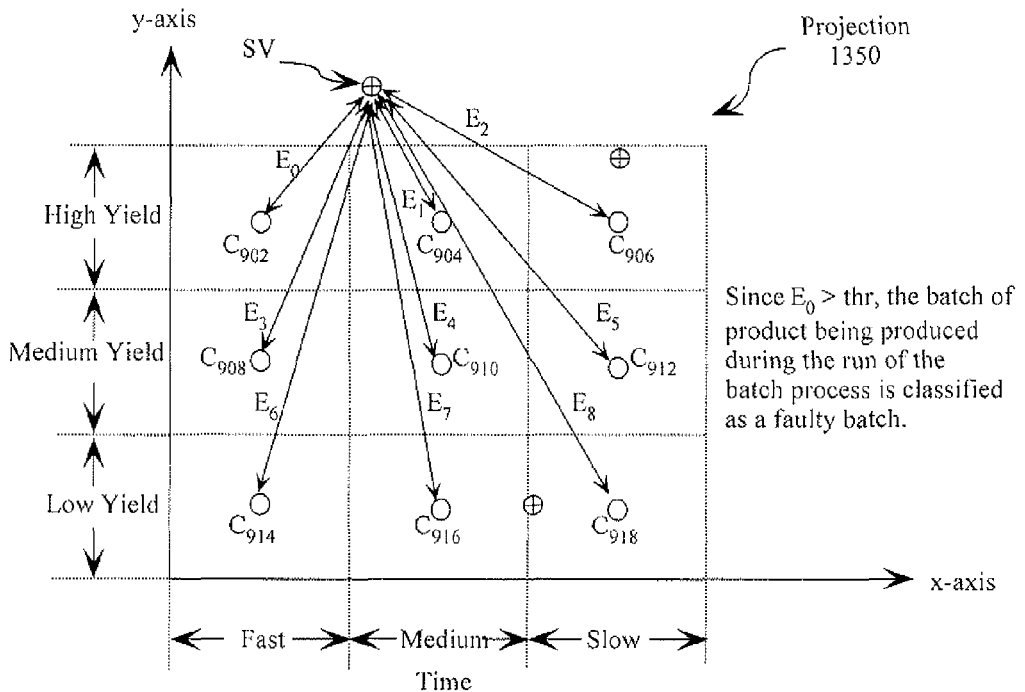

In step 712, Euclidean distances $E_0, \ldots, E_K$ of the score vectors $SV_{NEW}$ are computed to the centroids $C_{902}, \ldots, C_{918}$ of the clusters 902, ..., 918. Computational schemes for computing Euclidean distances $E_0, \ldots, E_K$ are well known to those having ordinary skill in the art, and therefore will not be described herein. Schematic illustrations of computed Euclidean distances are shown in FIGS. 13A-13B. As shown in FIGS. 13A-13B, each of the Euclidean distances $E_0, \ldots, E_8$ is generally the distance from a score vector SV to a respective centroid $C_{902}, \ldots, C_{918}$ of a cluster 902, ..., 918.

Subsequent to computing the Euclidean distances (similarity measures), step 714 is performed. In step 714, a determination is made as to whether a minimum Euclidean distance of the Euclidean distances $E_0, \ldots, E_K$ has a value greater than a prescribed statistical control $D_c$ (computed in step 332 of FIG. 3B). If the Euclidean distance is determined to have a value less than the prescribed statistical control [716:NO], then step 720 is performed. Step 720 can involve classifying the batch of product manufactured during the fully performed run $FPR_{NEW}$ in terms of the archived fully performed runs as a high batch, an average batch, a poor batch, or a variant thereof. Step 720 can also involve assigning the fully performed run $FPR_{NEW}$ to the cluster 902, ..., 918 corresponding to the minimum Euclidean distance. After completing step 720, step 722 is performed where method 700 ends. If the minimum Euclidean distance is determined to have a value greater than the prescribed statistical control [716:YES], then step 718 is performed where the batch of product manufactured during the fully performed run $FPR_{NEW}$ is classified as a faulty (abnormal) batch of product.

Figure 8A:
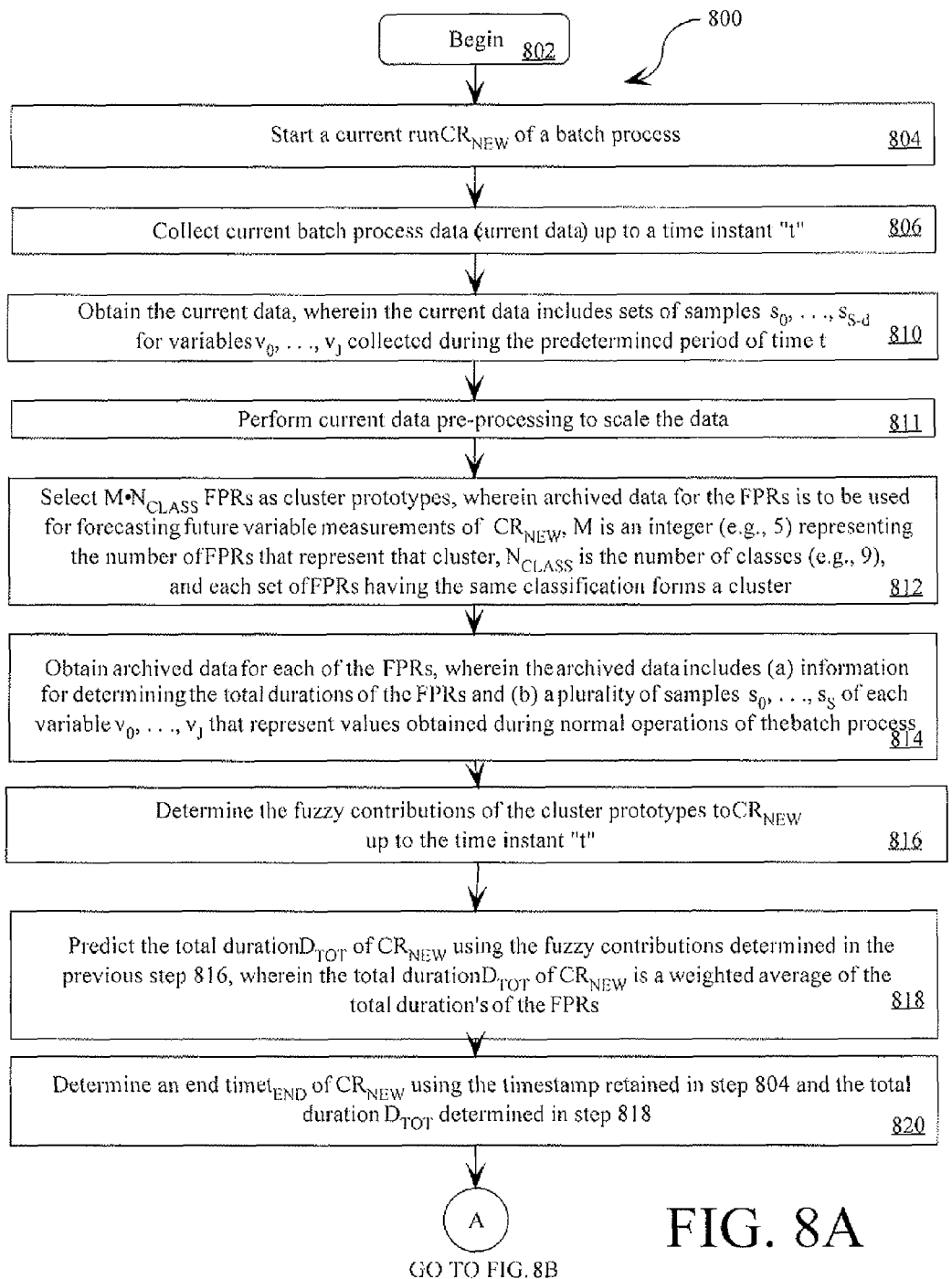
FIGS. 8A-8B collectively provide a flow diagram of a method for online performance monitoring of a batch process according to an embodiment of the invention.
Figure 8B:
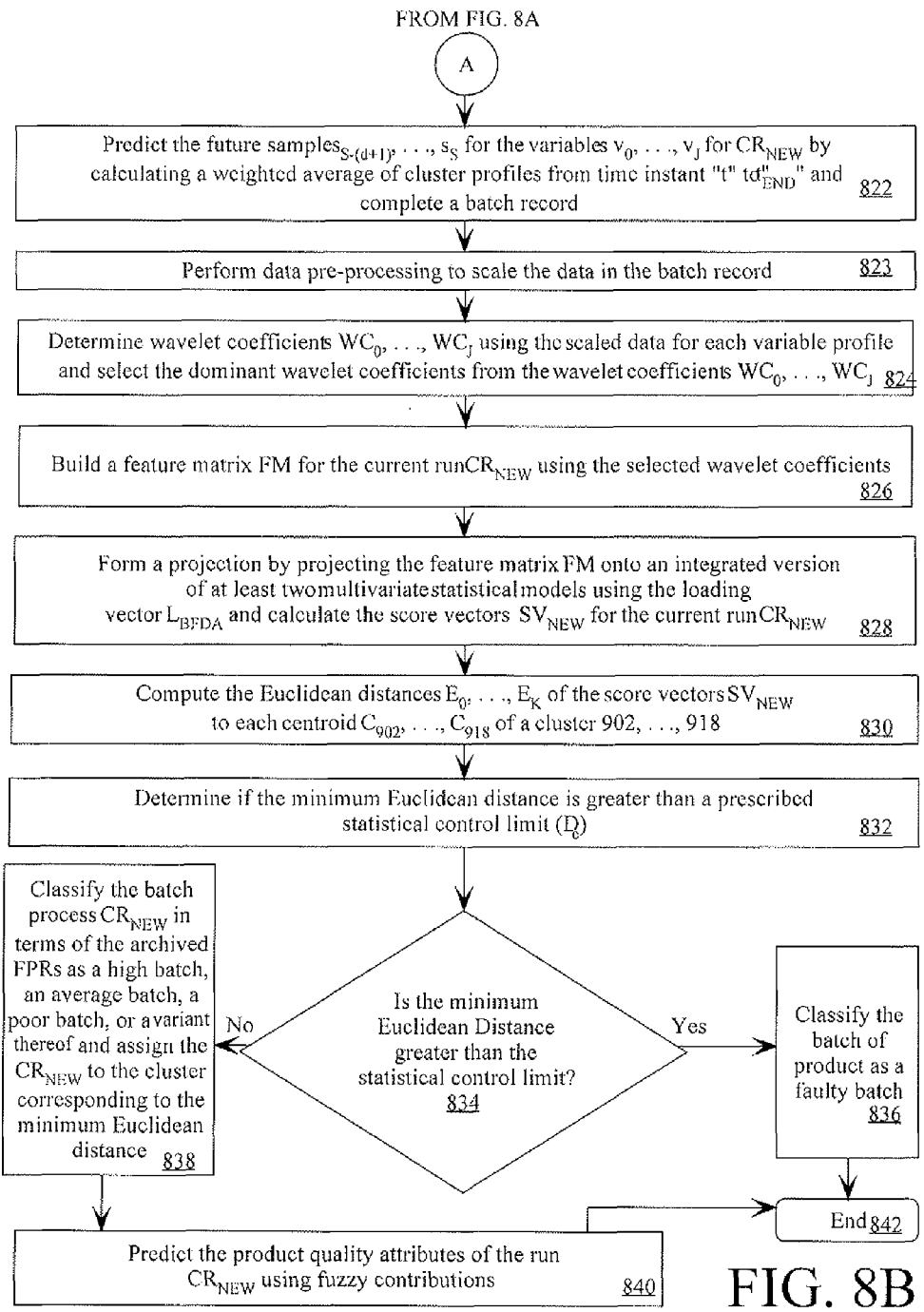

Referring now to FIGS. 8A-8B, there is provided a flow diagram of a method 800 for performing online performance monitoring of a batch process. Notably, method 800 can be performed in step 334 of FIG. 3B. As shown in FIG. 8A, method 800 begins with step 802 and continues with step 804. In step 804, a current run $CR_{NEW}$ of a batch process is started. After completing step 804, step 806 is performed where current batch process data (hereinafter referred to as "current data") is collected up to a time instant "t".

In step 810, the current data is obtained. The current data includes sets of samples $s_0, \ldots, s_{S-d}$ for the variables $v_0, \ldots, v_J$ collected during the period of time instant "t". Upon completing step 810, method 800 continues with step 811. In step 811, the retrieved current data is scaled generally using the same scaling method as was used in step 310 of FIG. 3A. These scaling methods are well known to those having ordinary skill in the art. Thereafter, step 812 is performed where $M \cdot N_{CLASS}$ FPRs (cluster prototypes) are selected. These cluster prototypes are understood as those FPRs that are maximally representative of the FPRs in that cluster as described above in relation to step 309 of FIG. 3A. M is an integer (e.g., 5) representing the number of prototype FPRs that represent the cluster. $N_{CLASS}$ is an integer (e.g., 9) representing the number of classes. Each set of the fully performed runs FPRs having the same classifications (i.e., exhibiting similarity) form a cluster. These cluster prototype profiles are used for forecasting future variable measurements of the current run $CR_{NEW}$. Also, the archived data for each of the fully performed runs FPRs can generally be used for forecasting future variable measurements of the current run $CR_{NEW}$. Accordingly, the next step 814 generally involves obtaining archived data for each of the fully performed run FPRs. The archived data can include information for determining the durations of the fully performed runs FPRs. The archived data includes a plurality of samples $s_0, \ldots, s_S$ for each variable $v_0, \ldots, v_J$ that represent values obtained during normal operations of the batch process.

Subsequent to obtaining the archived data for the fully performed runs FPRs, steps 816 is performed. In step 816, fuzzy contributions of the current run $CR_{NEW}$ to the clusters prototype profiles 902, ..., 918 are determined up to the time instant "t". The phrase "fuzzy contribution", as used herein, refers to the belonging in terms of similarity to the FVs corresponding to the cluster prototypes. Fuzzy contributions can be determined by using a Fuzzy classification algorithm (e.g., Fuzzy c-means algorithm). These fuzzy classification algorithms are well known to those having ordinary skill in the art, and therefore will not be described herein. Any known fuzzy contribution algorithm can be used without limitation.

After completing step 816, step 818 is performed. In step 818, a total duration $D_{TOT}$ of the current run $CR_{NEW}$ is predicted. This prediction involves using the fuzzy contributions determined in the previous step 816. The total duration $D_{TOT}$ of the current run $CR_{NEW}$ is generally a fuzzy weighted average of the durations of the fully performed runs FPRs. In step 820, an end time $t_{END}$ of $CR_{NEW}$ is determined using the timestamp retained in step 804 and the total duration $D_{TOT}$ determined in step 818. As should be understood, the end time $t_{END}$ can equal the total duration $D_{TOT}$. Upon completing step 820, method 800 continues with step 822 of FIG. 8B.

Referring now to FIG. 8B, step 822 involves predicting the future samples $s_{S-(d+1)}, \ldots, s_S$ for the variables $v_0, \ldots, v_J$ of the current run $CR_{NEW}$. This prediction is provided based on a calculation of a fuzzy weighted average of cluster prototype profiles from time instant t to $t_{END}$. The fuzzy weights are determined using the fuzzy classification algorithm (described above in relation to step 816). Step 822 can also involve completing a batch record using the predicted future samples $s_{S-(d+1)}, \ldots, s_S$ for the variables $v_0, \ldots, v_J$.

Thereafter, step 823 is performed where the data contained in the batch record are processed for scaling the same. In step 824, wavelet coefficients $WC_0, \ldots, WC_J$ are determined using the scaled data. The wavelet coefficients $WC_0, \ldots, WC_J$ can be determined in generally the same or substantially similar manner as the wavelet coefficients determined in step 314 of FIG. 3A. As such, the description provided above in relation to step 314 of FIG. 3A is sufficient for understanding how the wavelet coefficients $WC_0, \ldots, WC_J$ are determined in step 824 of FIG. 8B. Step 824 can also involve selecting the important wavelet coefficients from the wavelet coefficients $WC_0, \ldots, WC_J$ as defined above in relation to step 314 of FIG. 3A. It should also be understood that step 824 can be performed to compress the data and compactly represent the collected and predicted variables $v_0, \ldots, v_J$ of the current run $CR_{NEW}$.

Subsequent to completing step 824, step 826 is performed. In step 826, a feature matrix FM is built for the current run $CR_{NEW}$ using the selected wavelet coefficients. The feature matrix FM is built in generally the same or substantially similar manner as the feature matrix determined in step 317 of FIG. 3A. As such, the description provided above in relation to step 317 of FIG. 3A is sufficient for understanding how the feature matrix for the current run $CR_{NEW}$ is determined in step 826 of FIG. 8B.

After building the feature matrix, step 828 is performed. In step 828, a projection is formed by projecting the feature matrix onto an integrated version of two multivariate statistical models (e.g., the multivariate statistical model build in steps 328 of FIG. 3B). An exemplary integrated version of two multivariate statistical models is a BFDA multivariate statistical model. The projection can be formed using the matrix $L_{BFDA}$. Conceptual illustrations of exemplary projections 1300, 1350 are provided in FIGS. 13A-13B. Step 828 can also involve calculating the score vectors $SV_{NEW}$ for the current run $CR_{NEW}$.

After completing step 828, step 830 is performed where Euclidean distances $E_0, \ldots, E_K$ of the score vectors $SV_{NEW}$ are computed to each centroid $C_{902}, \ldots, C_{918}$ of clusters 902, ..., 918 on BFDA space. Computational schemes for computing Euclidean distances $E_0, \ldots, E_K$ are well known to those having ordinary skill in the art, and therefore will not be described herein. Schematic illustrations of computed Euclidean distances are shown in FIGS. 13A-13B. As shown in FIGS. 13A-13B, each of the Euclidean distances $E_0, \ldots, E_8$ is generally the distance from a score vector SV to a respective centroid $C_{902}, \ldots, C_{918}$ of a cluster 902, ..., 918.

Subsequent to computing the Euclidean distances, step 832 is performed. In step 832, a determination is made as to whether the minimum Euclidean distance has a value greater than a prescribed statistical control $D_c$. If the minimum Euclidean distance is determined to have a value less than a prescribed statistical control [834:NO], then step 838 is performed. In step 838, the performance of a batch of product manufactured during the current run $CR_{NEW}$ is classified in terms of the archived batch runs as a high batch, an average batch, a poor batch, or a variant thereof. Step 838 can also involve assigning the current run $CR_{NEW}$ to the cluster corresponding to the minimum Euclidean distance. Thereafter, step 840 is performed where the product quality attributes of the current run $CR_{NEW}$ are predicted using fuzzy contributions. The product quality attributes (e.g., yield) of the current run $CR_{NEW}$ is generally a fuzzy weighted average of the quality attributes of the fully performed runs FPRs. The fuzzy weights are determined using the fuzzy classification algorithm (described above in relation to step 816). Upon completing step 840, step 842 is performed where method 800 ends.

If the minimum Euclidean distance is determined to have a value greater than a prescribed statistical control [834:YES], then step 836 is performed. In step 836, the batch of product manufactured during the current run $CR_{NEW}$ is classified as a faulty batch of product. After classifying the batch of product, step 842 is performed where method 800 ends.

It should be noted that the classification of a batch of product as normal or faulty can aid a user (e.g., an operator, an engineer, a technician, and a supervisor) in making a decision on either to continue or terminate an evolving batch. Further, the classification of a normal batch of product in real time in terms of its performance can also aid a user (e.g., an operator, an engineer, a technician, or a supervisor) in making a decision as to enhance the performance of the normal batch towards the best known batch by initiating as appropriate set of remedial measures.

In light of the forgoing description of embodiments of the invention, it should be recognized that embodiments of the present invention can be realized in hardware, software, or a combination of hardware and software. A method for decoding an encoded sequence according to embodiments of the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Embodiments of the present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for offline/online performance monitoring of a batch process, comprising the steps of:
    obtaining archived batch process data (archived data) for said batch process comprising stored process data obtained during a plurality of runs of said batch process, said archived data comprising information defining at least one batch quality attribute for each of said plurality of runs of said batch process;
    forming a plurality of clusters by classifying said archived data for at least a portion of said plurality of runs into a plurality of classes based on said at least one batch quality attribute, wherein each said cluster comprises archived data for at least two runs of said plurality of runs having the same classification, is characterized by a centroid and a set of boundary batch run profiles that are representative of a batch behavior in a respective class of said plurality of classes;
    building a first feature matrix using said archived data, said first feature matrix comprising a plurality of first feature vectors consisting of wavelet coefficients that are determined as an approximation of a plurality of time trajectories of a plurality of variables;
    building a first multivariate statistical model (MSM) using a first multivariate statistical analysis method with said first feature matrix;
    forming a first projection by projecting said plurality of first feature vectors onto said first MSM;
    building a second MSM using a second multivariate statistical analysis method different from said first multivariate statistical analysis method with information obtained from said first projection;
    computing a plurality of centroids and a plurality of boundary profiles for said plurality of clusters; and
    performing said offline/online performance monitoring of said batch process using an integrated version of said first and second MSMs, said plurality of centroids, and said plurality of boundary profiles.

2. The method according to claim 1, wherein said at least one batch quality attribute comprises a yield of a run of said plurality of runs and/or a duration of said run.

3. The method according to claim 1, wherein said step of building said first MSM further comprises using a Principal Component Analysis based method to build said first MSM.

4. The method according to claim 1, wherein said step of building said second MSM further comprises using a Fisher Discriminant Analysis based method to build said second MSM.

5. The method according to claim 1, further comprising the steps of
    computing first sets of wavelet coefficients for each run of said plurality of runs using said archived data, and
    wherein said step of building said first feature matrix further comprises using said first sets of wavelet coefficients to build said first feature matrix.

6. The method according to claim 1, wherein said step of performing said offline/online performance monitoring further comprises:
    obtaining batch process data for a new fully performed run ($FPR_{NEW}$) of said batch process; and
    performing a performance assessment of said $FPR_{NEW}$ using said batch process data, said integrated version of said first and second MSMs, said plurality of centroids, and said plurality of boundary profiles.

7. The method according to claim 6, wherein said step of performing said performance assessment further comprises:
    building a second feature matrix comprising a plurality of second feature vectors using said batch process data;
    forming a third projection by projecting said second feature matrix onto said integrated version of said first and second MSMs;
    calculating score vectors $SV_{NEW}$ for said $FPR_{NEW}$ using information provided by said third projection;
    computing a plurality of distances of said score vectors $SV_{NEW}$ to said plurality of centroids or a plurality of cluster prototypes; and generating a performance assessment of said $FPR_{NEW}$ by comparing a smallest distance of said plurality of distances to a statistical control limit.

8. The method according to claim 7, wherein each of said plurality of distances is a variant of a Euclidean distance.

9. The method according to claim 1, wherein said step of performing an offline/online performance monitoring further comprises:

initiating a current run of said batch process;

collecting current batch process data (current data) during an interval of time during said current run that is less than a total duration for said current run;

forecasting future variable measurement values for said current run using archived data for said portion of said plurality of runs of said batch process; and performing a performance assessment of said current run using said current data, said future variable measurement values, said integrated version of said first and MSMs, said plurality of centroids, and said plurality of boundary profiles.

10. The method according to claim 9, wherein said step of forecasting future variable measurement values further comprises determining fuzzy contributions of said plurality of clusters or a plurality of cluster prototypes to said current run up to said interval of time "t", predicting an end time of said current run using said fuzzy contributions, and calculating a weighted average of a plurality of variable values contained in said archived data for said plurality of clusters from "t+1" to said end time.

11. The method according to claim 9, wherein said performance assessment comprises the steps of:

building a second feature matrix comprising a plurality of second feature vectors using said current data;

forming a third projection by projecting said second feature matrix onto said integrated version of said first and second MSMs;

calculating score vectors $SV_{NEW}$ for said $FPR_{NEW}$ using information provided by said third projection;

computing a plurality of distances of said score vectors $SV_{NEW}$ to said plurality of centroids; and generating a performance assessment of said current run by comparing a smallest distance of said plurality of distances to a statistical control limit.

12. A batch processing system configured for online and/or offline performance monitoring of a batch process, comprising:

a data retrieval device configured for obtaining archived batch process data (archived data) for said batch process comprising stored process data obtained during a plurality of runs of said batch process, said archived data comprising information defining at least one batch quality attribute for each of said plurality of runs of said batch process;

at least one processing device coupled to said data retrieval device and configured for (a) forming a plurality of clusters by classifying said archived data for at least a portion of said plurality of runs into a plurality of classes based on said at least one batch quality attribute, wherein each said cluster comprises archived data for at least two runs having the same classification, is characterized by a centroid and a set of boundary batch run profiles that are representative of a batch behavior in a respective class of said plurality of classes;

(b) building a first feature matrix using said archived data, said first feature matrix comprising a plurality of first feature vectors consisting of wavelet coefficients that are determined as an approximation of a plurality of time trajectories of a plurality of variables;

(c) building a first multivariate statistical model (MSM) using a first multivariate statistical analysis method with said first feature matrix;

(d) forming a first projection by projecting said plurality of first feature vectors onto said first MSM;

(e) building a second MSM using a second multivariate statistical analysis method different from said first multivariate statistical analysis method with information obtained from said first projection; and (f) computing a plurality of centroids and a plurality of boundary profiles for said plurality of clusters; and (g) performing said offline/online performance monitoring of said batch process using an integrated version of said first and second MSMs, said plurality of centroids, and said plurality of boundary profiles.

13. The batch processing system according to claim 12, wherein said at least one batch quality attribute comprises a yield of a run of said plurality of runs and/or a duration of said run.

14. The batch processing system according to claim 12, wherein said at least one processing device is further configured for using a Principal Component Analysis based method to build said first MSM and using a Fisher Discriminant Analysis based method to build said second MSM.

15. The batch processing system according to claim 12, wherein said at least one processing device is further configured for computing first sets of wavelet coefficients for each run of said plurality of runs using said archived data, and wherein said first feature matrix is built using said first sets of wavelet coefficients.

16. The batch processing system according to claim 12, wherein at least one processing device is further configured for obtaining batch process data for a new fully performed run ($FPR_{NEW}$) of said batch process, and performing a performance assessment of said $FPR_{NEW}$ using said batch process data, said integrated version of said first and second MSMs, said plurality of centroids, and said plurality of boundary profiles.

17. The batch processing system according to claim 16, wherein at least one processing device is further configured for building a second feature matrix comprising a plurality of second feature vectors using said batch process data, forming a third projection by projecting said plurality of second feature matrix onto said integrated version of said first and second MSM, calculating score vectors $SV_{NEW}$ for said $FPR_{NEW}$ using information provided by said third projection, computing a plurality of distances of said score vectors $SV_{NEW}$ to said plurality of centroids or a plurality of cluster prototypes, and generating a performance assessment of said $FPR_{NEW}$ by comparing a smallest distance of said plurality of distances to a statistical control limit.

18. The batch processing system according to claim 17, wherein each of said plurality of distances is a Euclidean distance or a variant of said Euclidean distance.

19. The batch processing system according to claim 12, wherein said at least one processing device is further configured for
- initiating a current run of said batch process,
- collecting current batch process data (current data) during an interval of time during said current run that is less than a total duration for said current run,
- forecasting future variable measurement values for said current run using archived data for said portion of said plurality of runs of said batch process, and
- performing a performance assessment of said current run using said current data, said future variable measurement values, said integrated version of said first and second MSM, said plurality of centroids, and said plurality of boundary profiles.

20. The batch processing system according to claim 19, wherein said at least one processing device is configured to forecast said future variable measurement values by determining fuzzy contributions of said plurality of clusters or a plurality of cluster prototypes to said current run up to said interval of time "t", predicting an end time of said current run using said fuzzy contributions, and calculating a weighted average of a plurality of variable values contained in said archived data for said plurality of clusters from "t+1" to said end time.

21. The batch processing system according to claim 20, wherein said at least one processing device is further configured for performing said performance assessment by
- building a second feature matrix comprising a plurality of second feature vectors using said current data,
- forming a third projection by projecting said plurality of second feature matrix onto said integrated version of said first and second MSMs,
- calculating score vectors $SV_{NEW}$ for said $FPR_{NEW}$ using information provided by said third projection,
- computing a plurality of distances of said score vectors $SV_{NEW}$ to said plurality of centroids, and
- generating a performance assessment of said current run by comparing a smallest distance of said plurality of distances to a statistical control limit.

\* \* \* \* \*